(12) United States Patent
Jayathirtha et al.

(10) Patent No.: US 12,417,423 B2
(45) Date of Patent: Sep. 16, 2025

(54) METHODS AND DASHBOARD SYSTEMS FOR REAL-TIME RECOMMENDATIONS FOR OPTIMIZED OPERATIONS

(71) Applicant: Honeywell International Inc., Charlotte, NC (US)

(72) Inventors: Srihari Jayathirtha, Johns Creek, GA (US); Wade Lindsey, Canton, GA (US); Syed Khaja Afzal Hussaini, Hyderabad (IN); Krishna Pillutla, Marietta, GA (US); Garrett Rysko, Bellevue, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 93 days.

(21) Appl. No.: 18/062,477

(22) Filed: Dec. 6, 2022

(65) Prior Publication Data
US 2024/0054431 A1 Feb. 15, 2024

(30) Foreign Application Priority Data
Aug. 9, 2022 (IN) .............................. 202211045468

(51) Int. Cl.
*G06Q 10/0639* (2023.01)
*G06Q 10/105* (2023.01)

(52) U.S. Cl.
CPC . *G06Q 10/06398* (2013.01); *G06Q 10/06393* (2013.01); *G06Q 10/105* (2013.01)

(58) Field of Classification Search
CPC ........................................ G06Q 10/00–50/00
(Continued)

(56) References Cited

U.S. PATENT DOCUMENTS 8,190,468 B1 * 5/2012 Drew ............... G06Q 10/06398
705/7.42
9,830,567 B2 * 11/2017 Weiss ............... G06Q 10/06311
(Continued)

FOREIGN PATENT DOCUMENTS

| EP | 3009968 A1 | 4/2016 |
| JP | 2020-035331 A | 3/2020 |
| JP | 2021-532436 A | 11/2021 |

OTHER PUBLICATIONS

Extended European search report Mailed on Nov. 27, 2023 for EP Application No. 23187956, 14 page(s).
(Continued)

*Primary Examiner* — Alan S Miller
(74) *Attorney, Agent, or Firm* — ALSTON & BIRD LLP

(57) ABSTRACT

Systems and methods are disclosed for worker performance scoring and evaluation of a job site, wherein the operation can include determine, by an insight module, dynamic allocation of workers of the warehouse according to locations within the warehouse, wherein the insight module is configured to aggregate and analyze data from the sensor devices and the worker computing devices; determine, by the insight module based on data aggregated in real-time from the sensor devices and the worker computing devices, the plurality of worker performance metrics, the plurality of worker performance metrics comprising at least one of a dynamic worker performance score, a worker productivity score, an aggregated idle time per worker; and generate on the dashboard of the display a dynamic real-time summary of the plurality of worker performance metrics.

20 Claims, 31 Drawing Sheets

(58) Field of Classification Search
USPC .................................... 705/7.11–7.42
See application file for complete search history.

(56) References Cited

U.S. PATENT DOCUMENTS

| | | | | |
|---|---|---|---|---|
| 9,833,197 | B1* | 12/2017 | Elhawary | A61B 5/0022 |
| 10,062,042 | B1* | 8/2018 | Kelly | G06Q 10/063112 |
| 10,235,646 | B2* | 3/2019 | Perry | G06Q 10/063112 |
| 10,674,965 | B2* | 6/2020 | Elhawary | A61B 5/1118 |
| 10,872,160 | B2* | 12/2020 | AthuluruTlrumala | G06Q 10/0633 |
| 11,327,795 | B1* | 5/2022 | Mundra | G06F 11/3433 |
| 11,803,795 | B2* | 10/2023 | Aoki | G06Q 10/0633 |
| 2009/0063238 | A1 | 3/2009 | Storzum et al. | |
| 2011/0227740 | A1* | 9/2011 | Wohltjen | G01S 11/16 340/686.6 |
| 2016/0300178 | A1* | 10/2016 | Perry | G06Q 10/063116 |
| 2018/0240140 | A1* | 8/2018 | Whitley | G06Q 50/22 |
| 2019/0080274 | A1* | 3/2019 | Kovach | G06Q 10/0639 |
| 2019/0108747 | A1* | 4/2019 | Stenning | G08B 21/187 |
| 2019/0122036 | A1* | 4/2019 | Ward | G06Q 10/06393 |
| 2019/0340346 | A1* | 11/2019 | Gibbs | G06Q 10/0639 |
| 2019/0343429 | A1* | 11/2019 | Elhawary | A61B 5/6823 |
| 2019/0347598 | A1* | 11/2019 | Sandusky | G06Q 10/06393 |
| 2019/0370721 | A1* | 12/2019 | Issac | B07C 5/36 |
| 2020/0074376 | A1 | 3/2020 | Kotake | |
| 2020/0174517 | A1* | 6/2020 | Martinez | G06Q 10/06398 |
| 2020/0219004 | A1* | 7/2020 | Daly | G06N 20/00 |
| 2020/0234220 | A1* | 7/2020 | Ma | G08G 1/148 |
| 2021/0035043 | A1* | 2/2021 | Burgess | G06F 9/541 |
| 2021/0090195 | A1 | 3/2021 | Lee et al. | |
| 2022/0164728 | A1* | 5/2022 | Aoki | G06Q 50/04 |
| 2022/0207452 | A1 | 6/2022 | Rorro et al. | |
| 2022/0245557 | A1* | 8/2022 | Minter | G06N 20/00 |
| 2022/0309079 | A1* | 9/2022 | Kurniawan | H04L 12/12 |
| 2023/0419232 | A1* | 12/2023 | Kaufmann | G06Q 10/06393 |

OTHER PUBLICATIONS

GB Combined Search Report and Abbreviated Examination Report Mailed on Jan. 25, 2024 for GB Application No. 2311569, 5 page(s).

CL Office Action Mailed on Oct. 17, 2024 for CL Application No. 202302300, 17 page(s).

English Translation of CA Office Action, including Search Report dated Oct. 29, 2024 for CA Application No. 3207502, 4 page(s).

English Translation of Office Action dated Oct. 17, 2024 for CL Application No. 202302300, 17 page(s).

GB Office Action Mailed on Oct. 11, 2024 for GB Application No. 2311569, 5 page(s).

English Translation of JP Office Action dated Aug. 8, 2024 for JP Application No. 2023125493, 3 page(s).

JP Office Action Mailed on Aug. 8, 2024 for JP Application No. 2023125493, 3 page(s).

CL Notice of Allowance Mailed on Feb. 4, 2025 for CL Application No. 202302300, 1 page(s).

CL Office Action Mailed on Jan. 15, 2025 for CL Application No. 202302300, 11 page(s).

English translation of CL Notice of Allowance dated Feb. 4, 2025 for CL Application No. 202302300, 1 page(s).

English Translation of JP Office Action dated Dec 25, 2024 for JP Application No. 2023125493, 2 page(s).

English Translation of Office Action dated Jan. 15, 2025 for CL Application No. 202302300, 11 page(s).

JP Office Action Mailed on Dec. 25, 2024 for JP Application No. 2023125493, 2 page(s).

SA Office Action Mailed on Mar. 4, 2025 for SA Application No. 123450109, 32 page(s).

SA Notice of Allowance Mailed on Jul. 31, 2025 for SA Application No. 123450109, 2 page(s).

* cited by examiner

| WORKER UTILIZATION | | | | |
|---|---|---|---|---|
| AREA | | | | THROUGHPUT |
| PICKING | 1 K/2 K<br>CURRENT/PLANNED | 64<br>TOTAL WORKERS | 100<br>CARTONS PER LABOR/MIN | 150<br>CARTONS/WORKER |
| SHIPPING | 1.9 K/2 K<br>CURRENT/PLANNED | 90<br>TOTAL WORKERS | 100<br>CARTONS PER LABOR/MIN | 300<br>CARTONS/WORKER |
| PACKING | 1.5 K/2 K<br>CURRENT/PLANNED | 84<br>TOTAL WORKERS | 100<br>CARTONS PER LABOR/MIN | 150<br>CARTONS/WORKER |

*FIG. 4A*

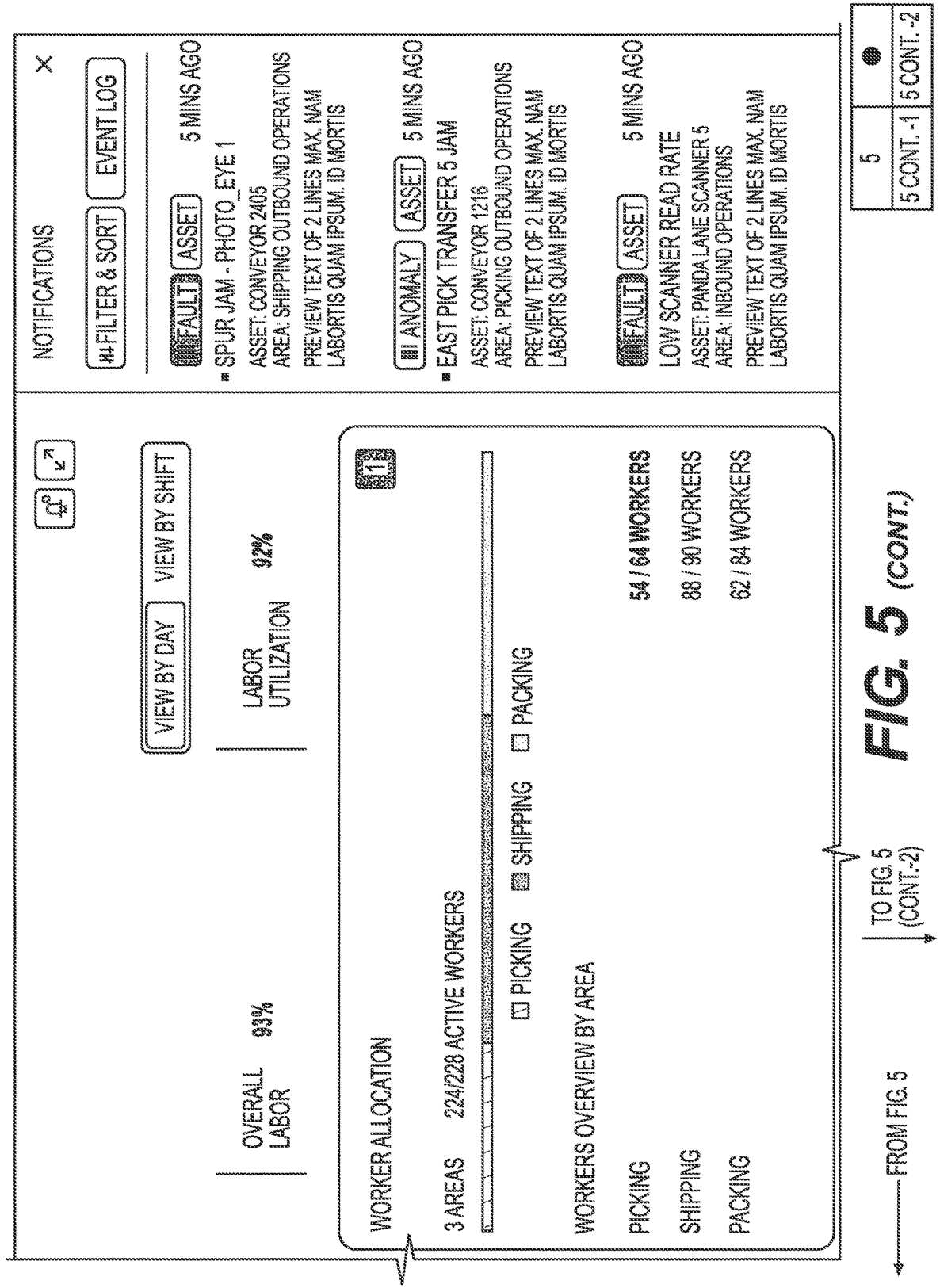
FIG. 5 *(CONT.)*

WORKER UTILIZATION

| AREA | CURRENT/PLANNED | TOTAL WORKERS | CARTONS PER LABOR/MIN | THROUGHPUT |
|---|---|---|---|---|
| PICKING | 1K/2K | 64 | 100 | 150 |
| SHIPPING | 1.9K/2K | 90 | 100 | 300 |
| PACKING | 1.5K/2K | 84 | 100 | 150 |

410

↑ FROM FIG. 5

TO FIG. 5 (CONT.-2) →

WORKER OPPORTUNITIES BY AREA

PICKING

NAME SURNAME    NAME SURNAME

SHIPPING

NAME SURNAME

| 5 | 5 CONT. |
|---|---|
| ● | 5 CONT. -2 |

JOE SMITH
CONFIG
SIGN OUT

FIG. 5 (CONT. -1)

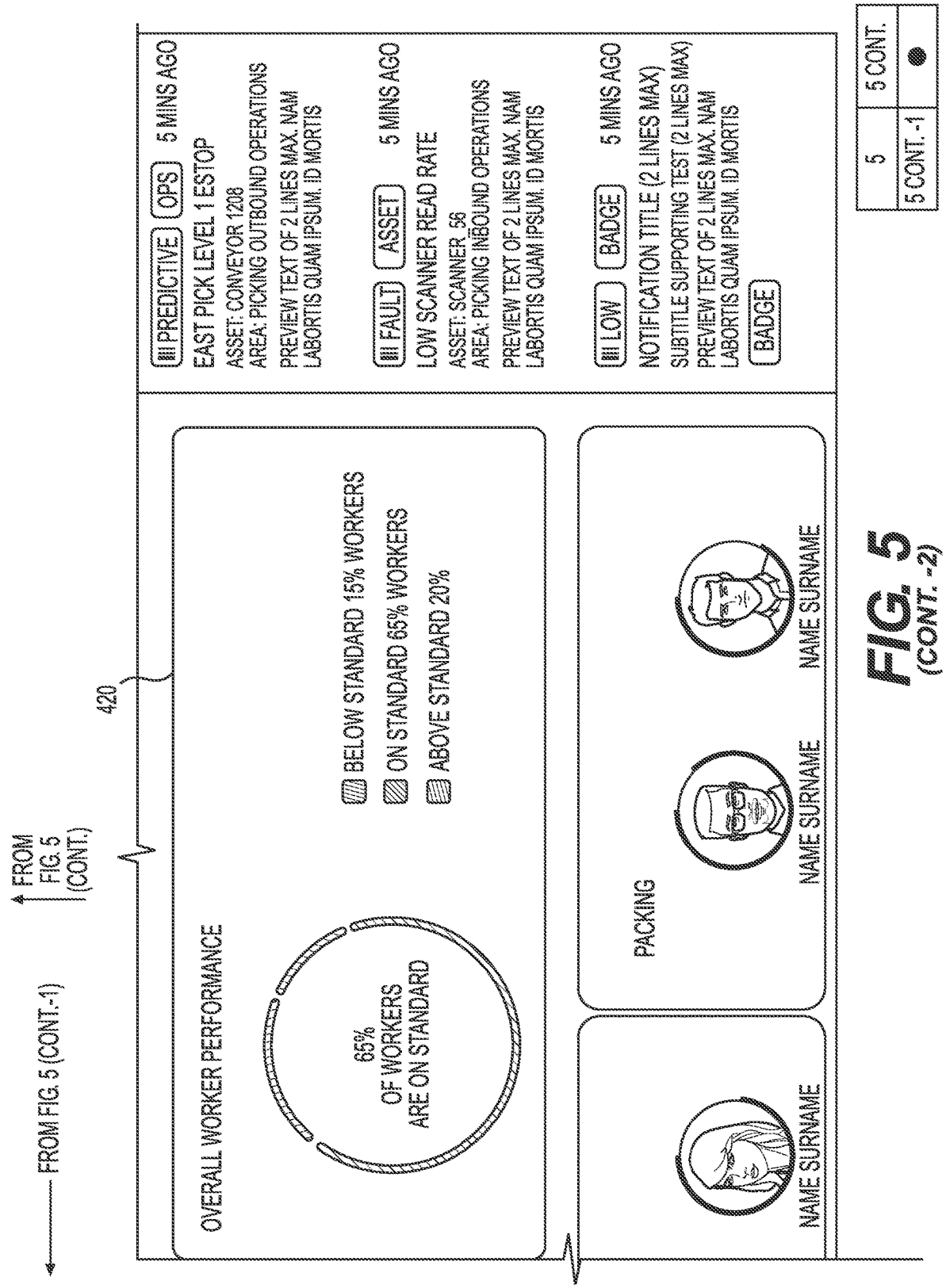
FIG. 5 (CONT. -2)

610

CREATE NEW TASK

TEMPLATE
[ TEMP REASSIGN TEAM ▽ ]

LOCATION
[ ZONE 2 ▽ ]

WORKER(S)
[ MY TEAM ▽ ]

PRIORITY
[ MOVE TO TOP ▽ ]

[ ASSIGN ]  [ CANCEL ]

620

TROUBLE REPORTED

PRINTER LD02
OUT OF MEDIA

⏲ 4:34 PM

ASSIGNED TO SHIPPING CLERK
CARLTON, JEREMY

[ DISMISS ]

622

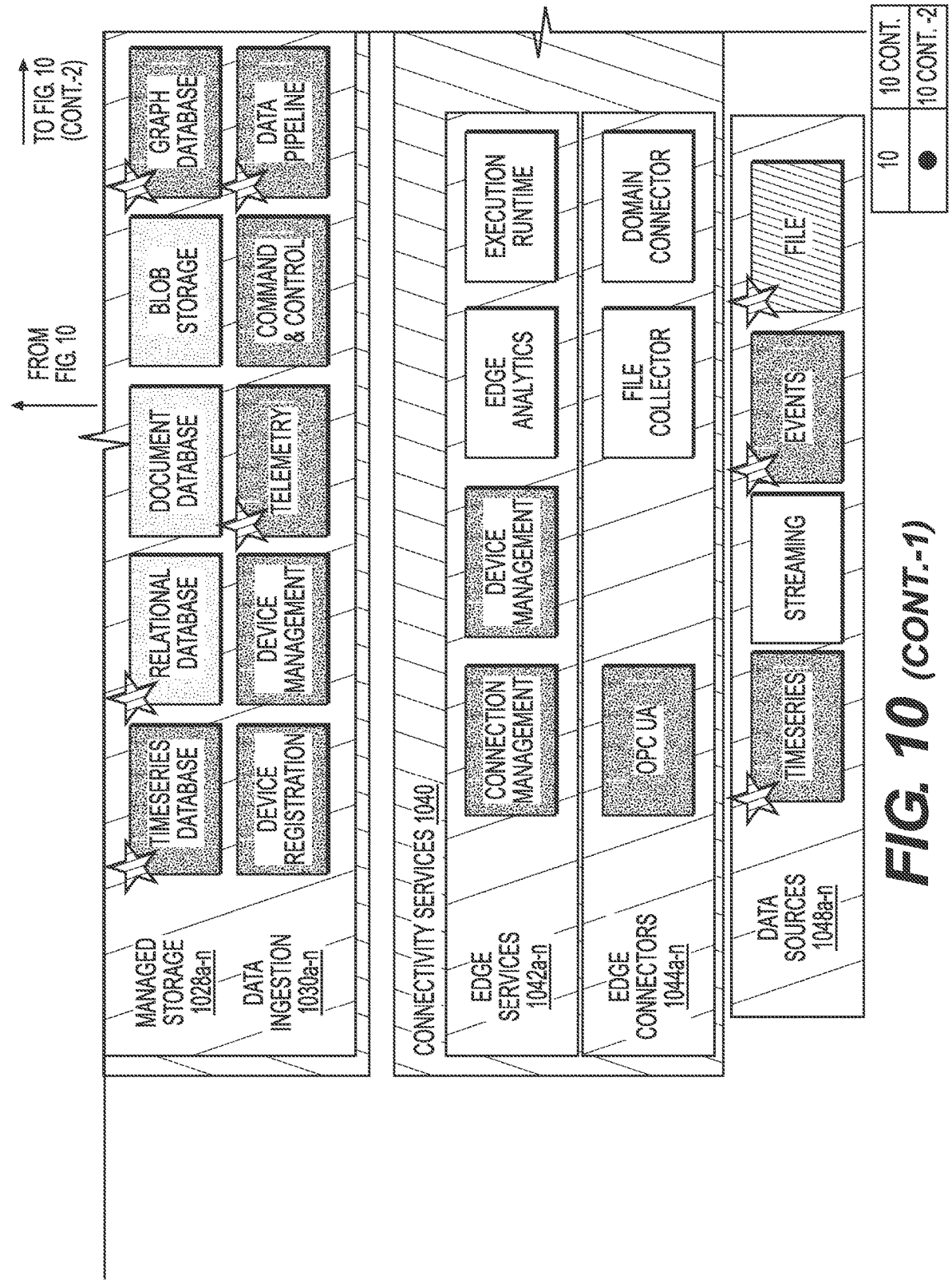
FIG. 10 (CONT.-1)

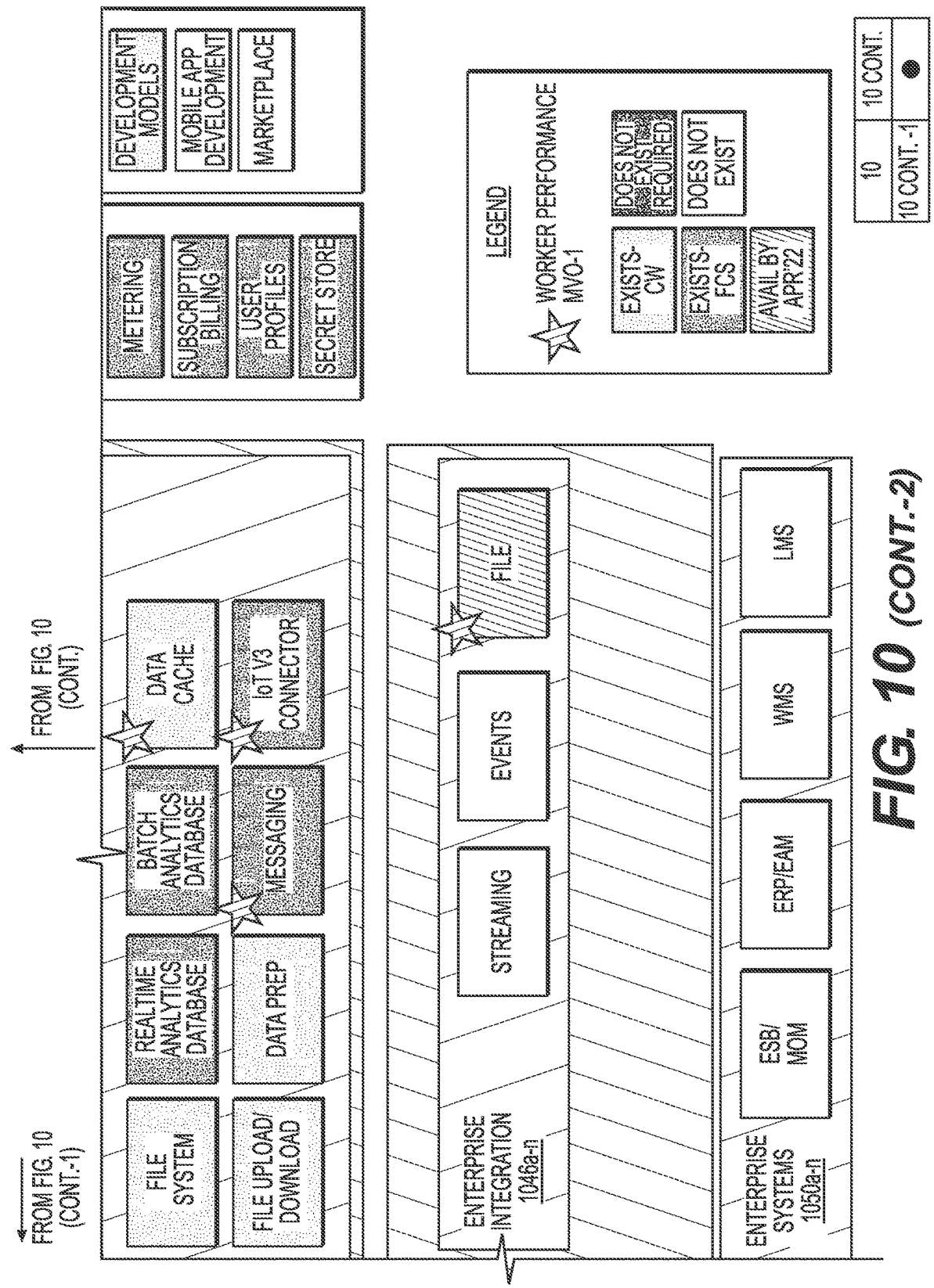
FIG. 10 (CONT.-2)

WORKER OVERVIEW 1610                                                                THIS WEEK

| WORKERS LIST 1612 | | | | | | ALL USERS | NEW HIRES |
|---|---|---|---|---|---|---|---|
| 🔍 SEARCH WORKERS | | 1624 | ⇅ FILTER & SORT ⌄ | | COLUMN CONFIGURATION | | |
| 100 WORKERS \| NO FILTERS APPLIED 1620 | | | | 1628 | 1632 | | 1636 |
| WORKER ⌄ 1616 | STATUS → | AREA → | USER TIME | IDLE TIME → | PERFORMANCE → | | EFFECTIVENESS → |
| 👤 JOHN DOE | ◯ ACTIVE | SHIPPING | ▭▭▭ | 45 MINUTES | 98% | | 99% |
| 👤 JANE DOE | ⊘ INACTIVE | SHIPPING | ▭▭▭ | 75 MINUTES | 98% | | 99% |
| 👤 SAM HUNT | ⊘ BREAK | PICKING | ▭▭▭ | 20 MINUTES | 98% | | 99% |
| 👤 JOE HART | ◉ IDLE | PICKING | ▭▭▭ | 30 MINUTES | 98% | | 98% |
| 👤 ANN KIM | ◯ ACTIVE | PACKING | ▭▭▭ | 60 MINUTES | 98% | | 98% |
| 👤 EVA SCHMIT | ◯ ACTIVE | PICKING | ▭▭▭ | 18 MINUTES | 95% | | 98% |

FIG. 16C *(CONT.)*

METHODS AND DASHBOARD SYSTEMS FOR REAL-TIME RECOMMENDATIONS FOR OPTIMIZED OPERATIONS

CROSS-REFERENCE TO RELATED APPLICATION(S)

This patent application claims the benefit of priority to Indian Application No. 202211045468, filed Aug. 9, 2022, which is incorporated herein by reference in its entirety.

TECHNICAL FIELD

The present disclosure relates generally to methods and systems to optimize operations in a workplace such as a warehouse, distribution center, airport ground operations, and retail generally.

BACKGROUND

Warehouses and distribution centers where employees are often engaged in a multitude of tasks can benefit from receiving real time and historical data from other sources. Further, overall operations can benefit from transmitting real time and historical data to optimize employee operations. Data patterns and trends can be determined from the received data, and the recipient can utilize the data patterns and trends to perform meaningful actions. In practice, employee task optimization is often lacking since a significant amount of optimization benefits have remained unreachable. Therefore, there is a need for a system for collecting and analyzing real-time data from employees, and also for sharing critical data through a streamlined communication network.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

One embodiment provides computer system for controlling worker performance in a job site, such as a connected warehouse. A plurality of sensor devices can be located throughout the connected warehouse and connected over a network. A plurality of worker computing devices can be included corresponding to at least one of a plurality of workers of the warehouse. A memory can be connected to the network and a user interface can be connected to the network include a display configured to display a real-time dashboard comprising a menu displaying a plurality of worker performance metrics in the warehouse. A processor connected to the network configured to determine, by an insight module, dynamic allocation of workers of the warehouse according to locations within the warehouse, wherein the insight module is configured to aggregate and analyze data from the sensor devices and the worker computing devices; determine, by the insight module based on data aggregated in real-time from the sensor devices and the worker computing devices, the plurality of worker performance metrics, the plurality of worker performance metrics comprising at least one of a dynamic worker performance score, a worker productivity score, an aggregated idle time per worker; and generate on the dashboard of the display a dynamic real-time summary of the plurality of worker performance metrics.

In some aspects, the insight module determines the plurality of worker performance metrics by aggregating and analyzing data from a plurality of connected warehouse service systems, a plurality of connected performance management systems, a connected labor management system (LMS), and a gateway device, and wherein the plurality of worker performance metrics comprise one or more worker performance scores.

In some aspects, the processor is configured to connect the plurality of sensor devices to one or more Internet-of-Things (IoT) devices connected to the gateway device, the plurality of sensor devices including one or a combination of leak detection sensors, vibration sensors, and process sensors of the connected warehouse.

In some aspects, the plurality of worker performance metrics in the dynamic summary include at least one of an overall workforce scorecard dashboard, an individual worker scorecard dashboard, and a management view option (MVO) performance scorecard dashboard.

In some aspects, the overall workforce scorecard dashboard comprises a plurality of dynamically updated performance notifications including at least one of a workforce startup module, an idle worker scorecard, a top/poor performer scorecard, a recent hire scorecard, and a worker allocation scorecard.

In some aspects, the individual worker scorecard dashboard includes a dynamically updated scorecard. The processor is configured to, upon determining whether worker performance metrics of an assigned task of a first worker of the plurality of workers satisfy a key performance indicator (KPI) task target deviation and/or a task performance standard, generate dynamic individual performance insights on the individual worker scorecard dashboard of the display.

In some aspects, the MVO performance scorecard dashboard includes a plurality of dynamically updated performance dashboards viewable by a management user and including at least one of a startup advisor dashboard, an idle worker advisor dashboard, a worker performance monitor and/or scorecard dashboard, and a schedule delay monitor.

In some aspects, the processor is configured to determine, by logic and analytics of the schedule delay monitor, a schedule delay insight score of the plurality of workers, the schedule delay score being based on worker performance and engagement scores.

In some aspects, the plurality of worker performance metrics includes a smart warehouse score summarizing overall warehouse workforce performance scores in real-time.

One embodiment provides a computer implemented method of operating a connected warehouse is disclosed by performing, by at least one processor, operations including determine, by an insight module, dynamic allocation of workers of the warehouse according to locations within the warehouse, wherein the insight module is configured to aggregate and analyze data from a plurality of sensor devices located throughout the warehouse and connected over a network and a plurality of worker computing devices, each worker computing device corresponding to at least one of a plurality of workers of the warehouse; determine, by the insight module based on data aggregated in real-time from the sensor devices and the worker computing devices, a plurality of worker performance metrics comprising at least one of a dynamic worker performance score, a worker productivity score, an aggregated idle time per worker; and generate on a real-time dashboard of a display a dynamic real-time summary of the plurality of worker performance metrics, the display being on a user interface connected to the network.

One embodiment provides a system for exchanging real-time worker performance data in a connected warehouse. The system includes one or more processors. The system includes a non-transitory computer readable medium storing instructions that, when executed by the one or more processors, cause the one or more processors to perform determine, by an insight module, dynamic allocation of workers of the warehouse according to locations within the warehouse, wherein the insight module is configured to aggregate and analyze data from a plurality of sensor devices located throughout the warehouse and connected over a network and a plurality of worker computing devices, each worker computing device corresponding to at least one of a plurality of workers of the warehouse; determine, by the insight module based on data aggregated in real-time from the sensor devices and the worker computing devices, a plurality of worker performance metrics comprising at least one of a dynamic worker performance score, a worker productivity score, an aggregated idle time per worker; and generate on a real-time dashboard of a display a dynamic real-time summary of the plurality of worker performance metrics, the display being on a user interface connected to the network.

To the accomplishment of the foregoing and related ends, certain illustrative aspects are described herein in connection with the following description and the appended drawings, including the appendix attached to this disclosure including other examples of the herein disclosed solution and which is incorporated by reference in its entirety as if set forth verbatim here. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which:

FIG. 4A depicts an example user interface dashboard in a mode, according to an exemplary embodiment.

FIG. 16B depicts an example close-up user interface dashboard of FIG. 16A in a worker overview mode, according to an exemplary embodiment.

DETAILED DESCRIPTION

Figure 1:
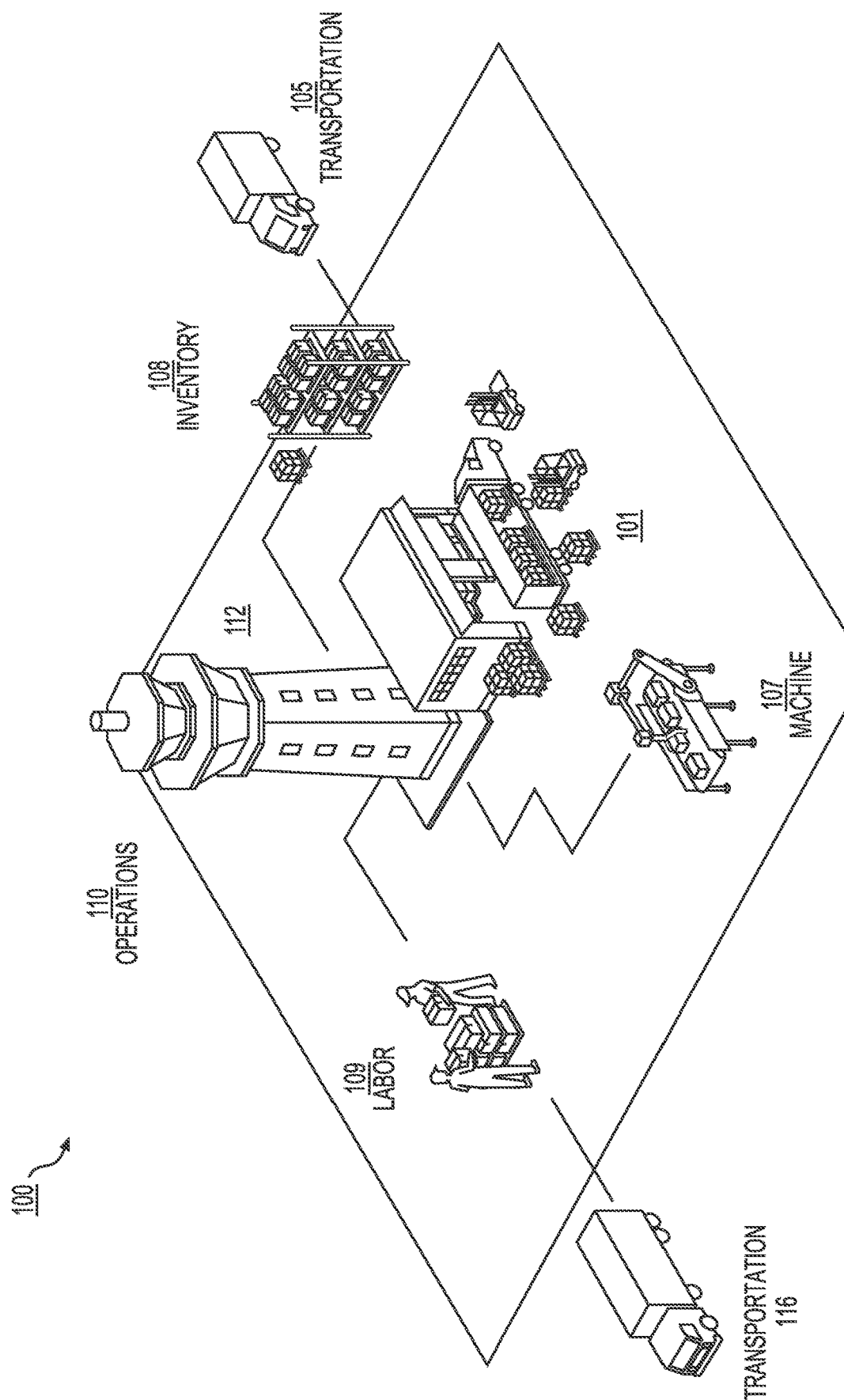
FIG. 1 is a schematic diagram illustrating an example environment implementing methods and systems of this disclosure.

The following embodiments describe systems and methods for facilitating a connected warehouse as between employees, managers, and other users as well as inter- and intra-warehouse edge communications systems.

Previous warehouse systems have included workers, such as employees, as well as operations managers and shift supervisors. Operations managers can be responsible for meeting production quotas, managing labor fluctuations, and quickly identifying restrictions and bottlenecks. Shift supervisors can be responsible for worker performance, overseeing specific work-sites and/or warehouse areas, and being generally "hands-on" on the warehouse floor. Collectively, each can balance warehouse staffing to prevent bottlenecks, ensure quality and timeliness of orders are fulfilled, improve throughput, maximize utilization, monitor and manage each site, and ensure smooth working of the warehouse.

That said, current approaches used to-date have suffered from various drawbacks. For example, current approaches are disconnected from viewing worker productivity until the end of a shift or workday. Real-time worker visibility is also lacking, making bottlenecks difficult to track and/or predict. In addition, unexpected workforce issues commonly lead to production and maintenance delays. Current approaches also fail to provide sufficient tools to react to such unexpected issues, such as unplanned events, and fail to adequately reallocate workers or take any corrective action. Further, root-causes of issues are presently not being tracked and thus problems are repeatedly occurring. In turn, worker attrition increases and performance declines.

A dynamic and decentralized technique for implementing a connected warehouse system is provided. An embodiment or implementation described herein as "dynamic" is intended to reflect or indicate that the embodiment(s) is or can be marked by continuous and productive activity or change, though not necessarily constantly changing. The system and corresponding techniques facilitate communications within one or more warehouses, between users (e.g., worker, teams of workers, manager, etc.), and between warehouses, third parties associated therewith, and data centers. Such communications may be facilitated by edge systems and gateway systems. The edge and gateway systems may be located in warehouses (i.e., on-site) as embedded or fixed systems and/or other user devices such as tablet PCs and mobile phones (e.g., devices controlled by or in communication with an operations manager, etc). Each edge system may be coupled to a warehouse system from which warehouse operations data may be collected, and in communication with other edge systems and gateway systems. Each gateway system may be in communication with warehouse operation systems and edge systems of the warehouse in which the gateway system is resident (e.g., with the operations manager), and may also be in communication with gateway systems located in other warehouses, all or some of which may provide data to the gateway system. By facilitating communication with gateway systems located in other warehouses, the gateway system may enable exchange of data among edge systems installed in different warehouses. Independent user computing devices, such as tablet PCs and mobile phones, may be directly coupled to and/or in communication with the edge systems and/or gateway systems, to request, filter, view, and/or analyze data.

Hardware for all or some of the edge systems and gateway systems may be installed in warehouses. Therefore, software may be installed on the corresponding warehouse hardware. The software implemented in the edge systems and gateway systems may comprise computer-executable code for performing various data functions, including but not limited to, data request, data query, data retrieval, data transmission, and data analytics. The edge systems and gateway systems each identify source(s) of relevant data, and request that data be provided dynamically (as needed) or statically (all the time) from the identified source(s), such as from other edge systems coupled to warehouse systems in the warehouse or other warehouses, gateway systems in the warehouse or other warehouses, decentralized system(s) such as cloud computing center(s), and centralized system(s) such as dedicated server farms. The decentralized system(s) and centralized system(s) may be owned by the operators of the warehouses, or by a third party such as a government or a commercial entity.

Each edge system in a warehouse may be coupled to a sensor of a corresponding warehouse system in the same warehouse, enabling data captured by the sensor to be provided directly to the edge system. Also, a gateway system in a warehouse may be coupled to one or more sensors of warehouse systems in the same warehouse, enabling data captured by the one or more sensors to be provided directly to the gateway system. In another embodiment, each edge system in a warehouse may be coupled to warehouse system of a corresponding warehouse system in the same warehouse. Also, a gateway system in a warehouse may be coupled to warehouse system machines of warehouse systems in the same warehouse. In some aspects, warehouse system machines may be configured to collect data from the coupled one or more sensors, perform computations and/or analysis of the collected data, store the collected and/or analyzed data in memory, and provide the collected and/or analyzed data to one or more connected edge systems and/or gateway system. In some embodiments, the warehouse system may not be implemented, or may not be coupled to the one or more sensors of the warehouse system. If the warehouse system machine is not implemented or not coupled to the one or more sensors, data captured by the one or more sensors may be provided directly to the one or more connected edge systems and/or gateway system.

Each warehouse system may be in communication with, through an edge system or not, a gateway system. Edge systems in a warehouse may be in direct communication with one another. For example, any data retained by one edge system may be transmitted directly to another edge system within the same warehouse, without a gateway system acting as an intermediary. In another embodiment, an edge system may send to or receive data from another edge system located in the same warehouse through a gateway system. The communication between the edge systems and the communication between the edge systems and the gateway system may be through a wired or wireless connection.

A gateway system of a warehouse may be in communication with gateway systems of other warehouses. Through this communication path, an edge system or a gateway system of a warehouse may transmit data to and obtain data from edge systems or gateway systems of other warehouses. The communication path between gateway systems of different warehouses may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed. An edge system in a warehouse may communicate with another edge system in a different warehouse via gateway systems of the respective warehouses. For example, an edge system in a warehouse may transmit data to one or more edge systems in other warehouses via the gateway systems of the respective warehouses communicating over the communication path discussed above.

Each edge system and gateway system may comprise state machines, such as processor(s) coupled to memory. Both the edge systems and the gateway systems may be configured with a common operating system to support portable, system-wide edge software implementations. In other words, each of the edge systems and the gateway systems may be equipped with standard software to facilitate inter-operability among the edge systems and the gateway systems. In the discussion below, such software will be referred to as edge software. The edge software may enable each edge system or gateway system to perform various functions listed below (non-exhaustive) to enable data analysis and data exchange among the various systems illustrated herein (e.g., edge systems, gateway systems, warehouse operations centers, remote systems):

Filter and analyze real-time and stored data collected from other edge systems, warehouse systems, gateway systems, and/or operations center(s), and generate events based on the analysis;

Identify dynamic (i.e., as needed) and static (i.e., all the time) data transmission targets (e.g., edge systems within the same warehouse, edge systems in other warehouses, operations center(s));

Transmit data over an Internet connection to the operations centers;

Transmit data and events to other edge and gateway systems within an aircraft that are connected over wired/wireless networks, or to other edge and gateway systems external to the aircraft that are connected over the Internet;

Provide a request/response interface for other edge/gateway systems, warehouse borne computer systems, operations centers, and remote systems connected over wired/wireless networks or Internet to query the stored data and to dynamically select/change data filters;

Use request/response interfaces provided by other edge systems, gateway systems, and operations centers connected over wired/wireless networks or Internet to obtain data and to dynamically select/change data filters;

Receive events from other edge systems, gateway systems, and operations centers; and Specify and communicate generic purposes (i.e., types of data the edge/gateway system is interested in) to other edge systems, gateway systems, and operations centers.

Each edge system or gateway system may autonomously select and deliver data to one or more transmission targets, which may be other edge systems in the same warehouse, edge systems in other warehouses, gateway system in the same warehouse, gateway systems in other warehouses, or operations center(s). Each of the receiving edge or gateway systems (i.e., transmission targets) may be configured to filter the received data using a pre-defined filter, overriding the autonomous determination made by the edge system transmitting the data. In some embodiment, each receiving edge or gateway system may notify the other systems, in advance of the data transmission, of the types of data and/or analysis the receiving system wants to receive (i.e., generic "purposes"). Also, each edge or gateway system may maintain a list including static data transmission targets (transmission targets that always need the data) and dynamic data transmission targets (transmission targets that need the data on as-needed basis).

A gateway system of a warehouse may also be in communication with one or more operations centers, which may be located remotely from the warehouse (i.e., off-site). In some embodiments, however, the operations center(s) may be located on-site at the warehouse. Each of the warehouse systems of this disclosure may be implemented in a dedicated location, such as a server system, or may be implemented in a decentralized manner, for example, as part of a cloud system. The communication path between the gateway systems and the operations center(s) may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). Furthermore, the method presented in the drawings and the specification is not to be construed as limiting the order in which the individual steps may be performed. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" or "in some embodiments" as used herein does not necessarily refer to a different embodiment. It is intended, for example, that claimed subject matter include combinations of exemplary embodiments in whole or in part.

FIG. 1 illustrates an exemplary warehouse and/or distribution center environment 100 with certain components, including delivery transportation 105 (e.g., supply chain delivery truck) to load into inventory 108. An operational control tower 112 may monitor and/or otherwise control operations 110 within environment 100. Operations 110 can be performed and/or managed by labor 109. Operations 110 can include loading 101 and assembly machines 107. Once assembled, packaged, and otherwise processed for distribution, transportation 116 (e.g., a freight truck) can be loaded by labor 109 and depart for its subsequent destination. The environment 100 is configured to optimize worker performance by selectively scheduling and assigning tasks and worker equipment, as discussed more particularly below. The term "worker" can be understood as a human, a non-human animal (e.g., a trained animal such as a dog) or any other asset that performs tasks at a job site (e.g., a robotic device).

Figure 2:
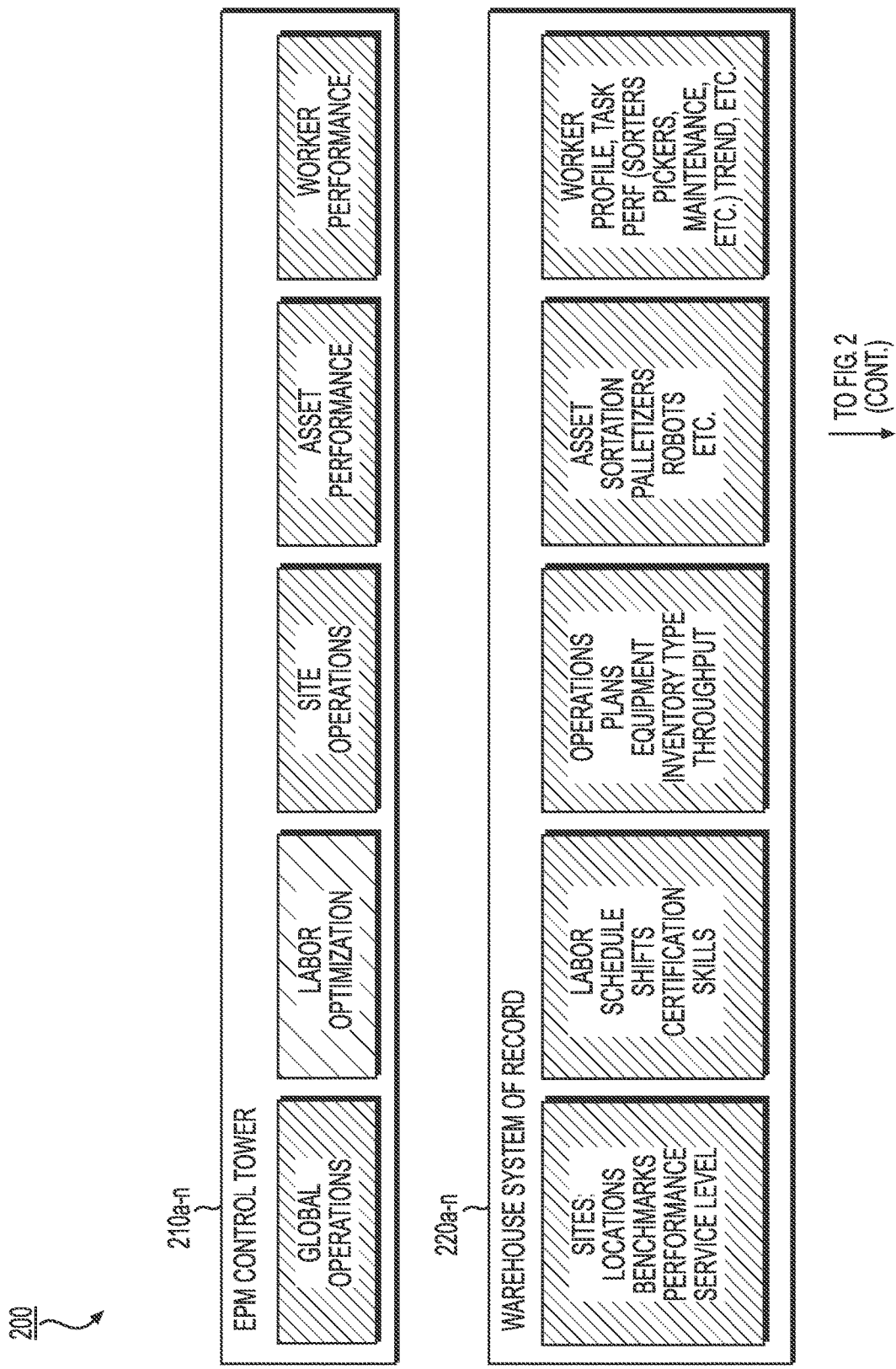
FIG. 2 is a diagram of architecture of a connected warehouse system of this disclosure.
Figure 2:
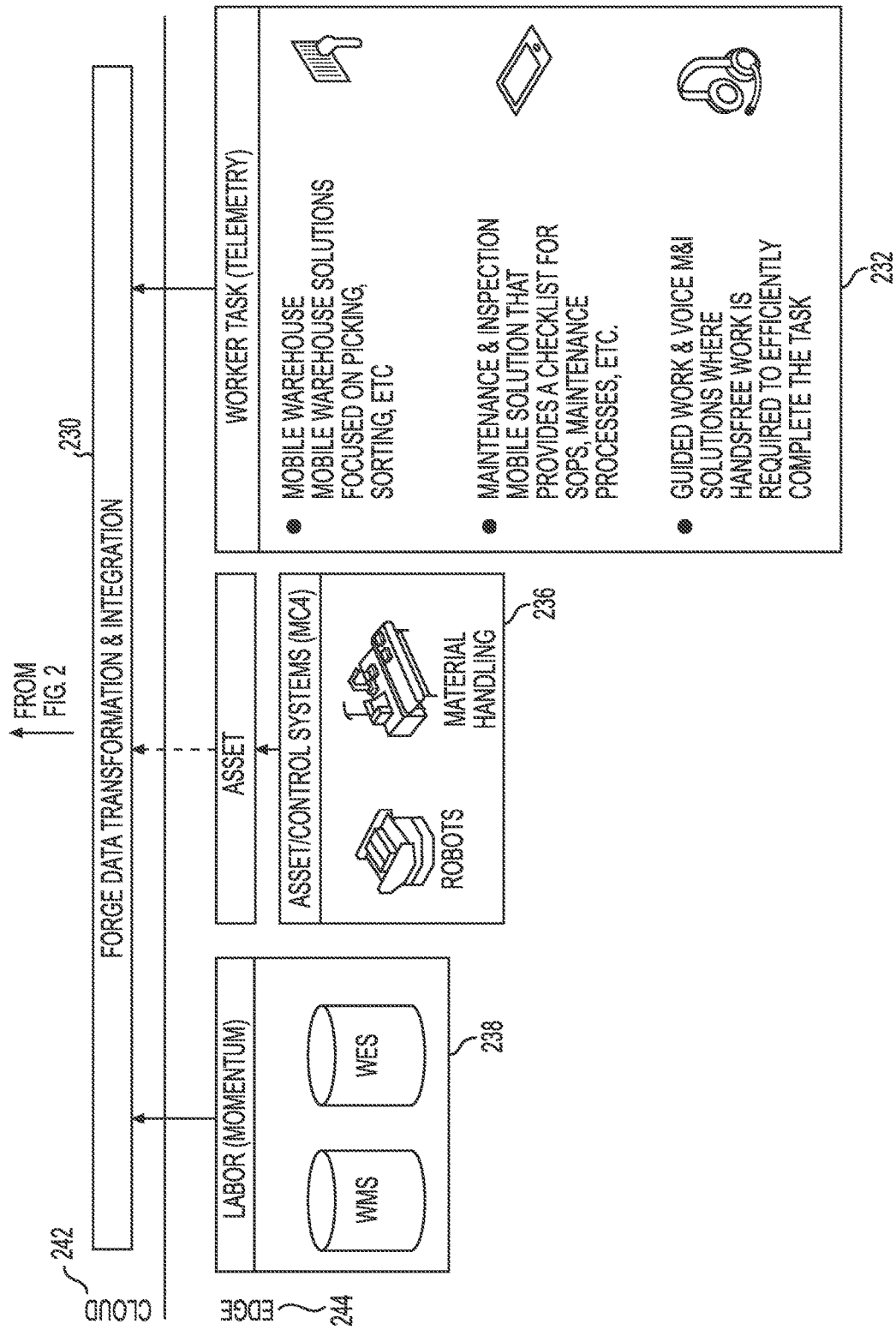

FIG. 2 is a diagram of architecture associated with of a connected warehouse system 200 of this disclosure. System 200 can include enterprise performance management (EPM) control tower 210*a-n*, including components and databases such as but not limited to global operations, labor optimization, site operations, asset performance, and worker performance. System 200 can also include a networked warehouse system of record 220*a-n*, including components and databases such as but not limited to sites (e.g., locations, benchmarks, performance service level, etc.), labor (e.g., schedule, shifts, certification, skills, etc.), operations (e.g., plans, equipment, inventory type, throughput, etc.), assets (e.g., sortation, palletizers, robots, etc.), and workers (e.g., trends, profiles, task performance such as sorters, pickers, maintenance works, etc.). EPM control tower 210*a-n* and networked warehouse system of record 220*a-n* can reside in a cloud based computing system 242 (e.g., a cloud computing network, one or more remote servers) and be communicatively coupled to forge data transformation and integration layer 230.

System 242 may be communicatively coupled to an edge computing system 244. System 244 can be an edge computing system or node with a dedicated unit onsite at the work site (e.g., factory, distribution center, warehouse, etc.). System 244 can be configured to process data and information from labor database 238, asset control systems 236 (e.g., components related to control of robots, material handling, etc.) and worker tasks database 232. Database 238 can include databases for warehouse management services (WMS) and warehouse execution systems (WES).

Database 232 can include one or more telemetry components operatively coupled to features of distribution center environment 100 so as to process and transmit control information generated subscribing to incoming control information for consumption by one or more controllers of system 240 over a network. Database 232 can be configured for data validation and modification for incoming telemetry or attributes before saving to the database; copy telemetry or attributes from devices to related assets so you can aggregate telemetry, e.g., data from multiple subsystems can be aggregated in related asset; create/update/clear alarms based on defined conditions; trigger actions based on edge life-cycle events, e.g., create alerts if device is online/offline; load additional data required for processing, e.g., load threshold value for a device that is defined in a user, device, and/or employee attribute; raise alarms/alerts when complex event occurs and use attributes of other entities inside email template; and/or consider user preferences during event processing. In some aspects, messages transmitted from database 232, such as triggers and/or alerts, can be configured for transmitting information to an end user (e.g., site lead, crew in the control tower, etc.) for optimization purposes. System 200 can also be configured to detect near accidents or other misses to build a trend model for early detection of anomalies before faults or malfunctions occur increasing safety. In some aspects, the trend model can perform statistical analysis of worker trends including assigned tasks, event datasets to derive insights on worker performance considering the nature of work, skillset, criticality, labor intensity, etc. In some aspects, the trend model can classify data on a variety of key performance parameters to generate reports, dashboards, and insights that can be presented to users. In some aspects, the trend model can determine benchmarks based on statistics for type of task, skill set, geographical location, industry etc. to enable performance-based assessment, incentives and target setting for worker operations.

Database 232 can include mobile warehouse solutions focused on picking, sorting, and other such tasks. Database 232 can include maintenance and inspection components configured to provide one or more checklists with standard operating procedures (SOPs), maintenance processes, and the like. Database 232 can include guided work and voice maintenance and inspection components configured where hands-free work is required by employees to complete a task.

Figure 3:
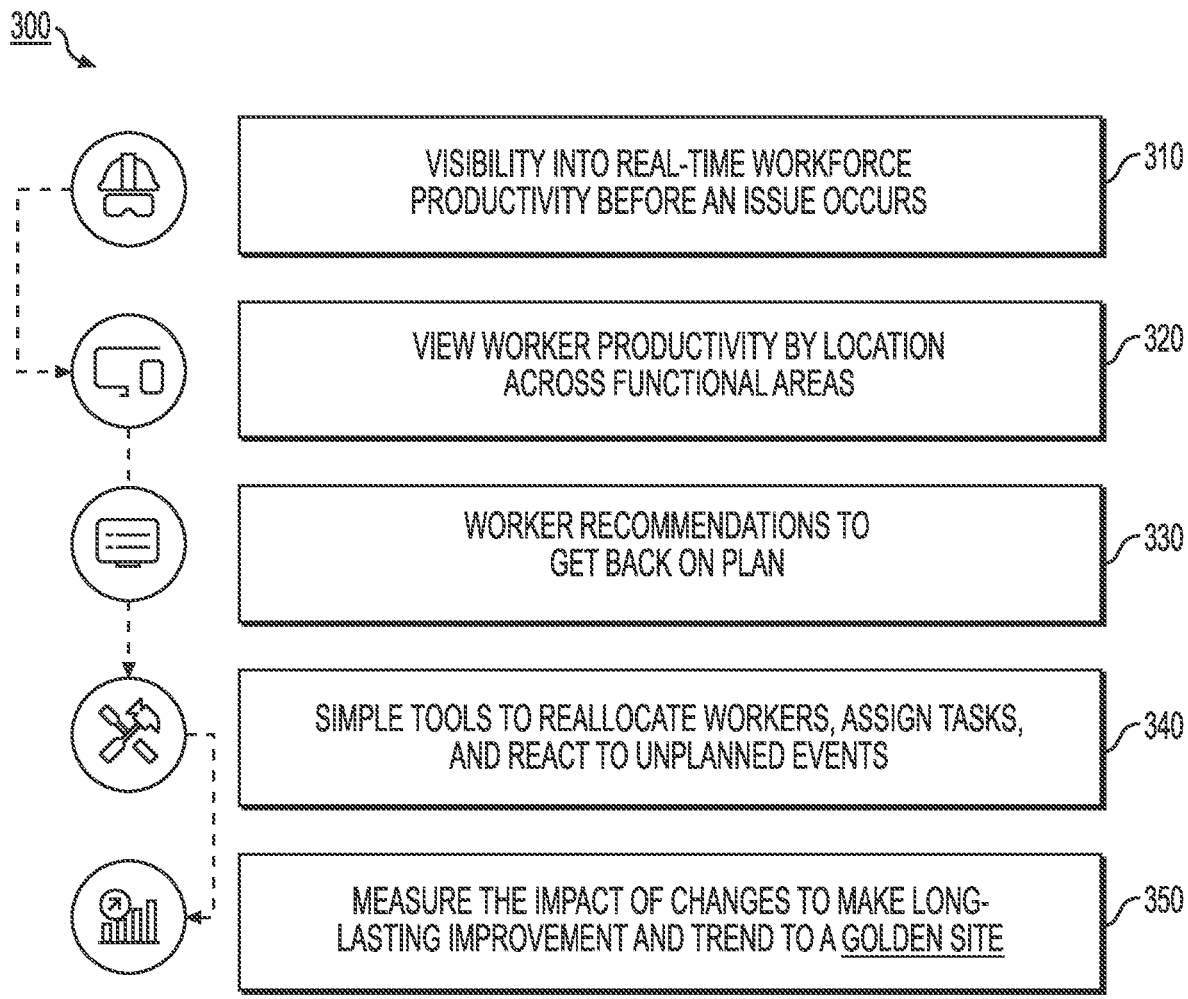
FIG. 3 is a flowchart illustrating a method for monitoring safety.

FIG. 3 is a flowchart illustrating a method 300 for optimizing operations of a job site. In step 310, the method can include providing visibility into real-time workforce productivity before an issue occurs. In step 320, the method can include viewing worker productivity by location across functional areas. In step 330, the method can include providing worker recommendations to return to a worker plan. In step 340, the method can include providing tools to reallocate workers, assignment tasks, and react to unplanned events. In step 350, the method can include measuring the impact of changes to make persistent improvement and trend to an optimized job site (e.g., a golden site).

FIG. 4A is an example user interface dashboard 410 associated with the worker performance database of EPM control tower 210*a-n*. As shown, dashboard 410 can present information related to overall worker utilization including utilization from a plurality of locations (e.g., picking location, shipping location, packing location, etc.) of a job site and/or multiple job sites. Dashboard 410 can present inferences from processed data associated with the plurality of locations, including operational status as to current and planned events, total workers, labor efficiency rates (e.g., cartons per labor/min) and effective throughput metrics (e.g., cartons/worker or some other worker specific metric to measure performance). The information presented in dashboard 410 can be presented in any number of ways, including color coded (e.g., red for events that require immediate attention, green for metrics that are in excess of an objective goal, grey for events that are neutral or within a range of compliance for an objective goal, etc.).

Figure 4B:
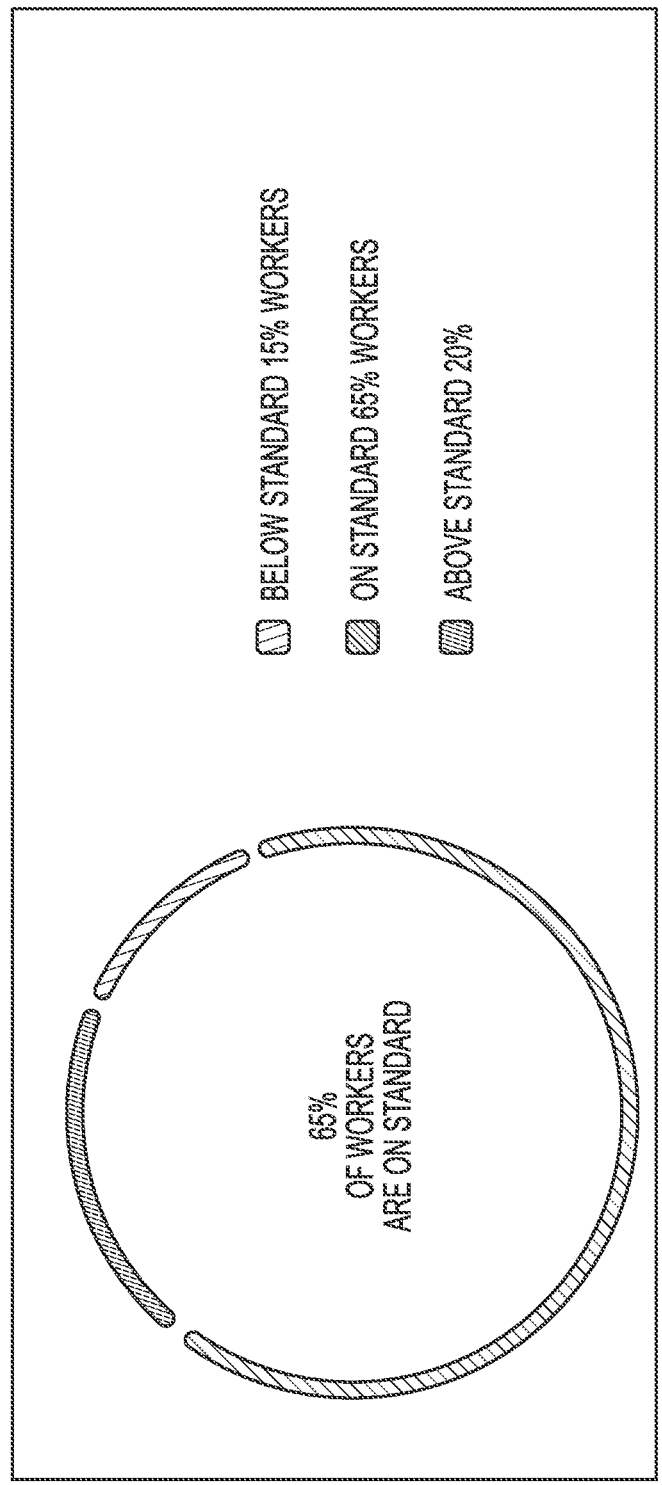
FIG. 4B depicts an example user interface dashboard in another mode, according to an exemplary embodiment.

FIG. 4B is an example user interface dashboard 420 associated with the worker performance database of EPM control tower 210*a-n*. As shown, dashboard 420 can present information related to worker performance. Through dashboard 420, a user can observe real-time performance, how current performance measures against objective planned performance goal(s), object measures of worker engagement, and or the like. In some aspects, one or more alerts can be presented or otherwise pushed onto dashboard 420 instructing a user (e.g., an employee, a manager, etc.) to take one or more corrective actions to improve productivity (e.g., return to a task, improve one criteria of a task that is lacking, improve engagement in an area of engagement, etc.) of one or more operational disruptions. In some aspects, corrective actions can include determining the right worker for a particular task based on the worker's profile and/or preferences, including job location or zone with job location, physical demand, temperature, shift, seniority, performance against the necessary tasks etc. to inform recommendations to move workers from area to another to mitigate attrition and maximize worker satisfaction. In some aspects, the one or more messages include workplace hazard avoidance, employee efficiency, work area efficiency, worker performance metrics, and worker performance safety. In some aspects, messages transmitted in or by dashboard 420, such as triggers and/or alerts, can be configured for transmitting information to remote computing systems, locations, and/or other interested users. Dashboard 420 can also be configured to detect near performance misses, trends, or other performance related events to build a trend model for early detection of anomalies before performance faults or malfunctions occur increasing worker engagement and performance.

Dashboard 420 can present worker performance summaries from processed data associated with a worker or plurality of workers, including operational status as to the worker or plurality of workers being below standard, on standard, above standard, etc. Other metrics and/or alerts can be presented in dashboard 420, including information related to location or worker area and metrics related thereto as to workers performing below, at, or above standard (e.g., a message can indicate that 10 workers in a location are performing below standard, a message can recommend to move a specific employee to another location, etc.). The information presented in dashboard 420 can be presented in any number of ways, including color coded (e.g., red for worker(s) who are performing below standard, green for worker(s) who are performing above standard, blue for worker(s) who are performing on standard, etc.).

Figure 4C:
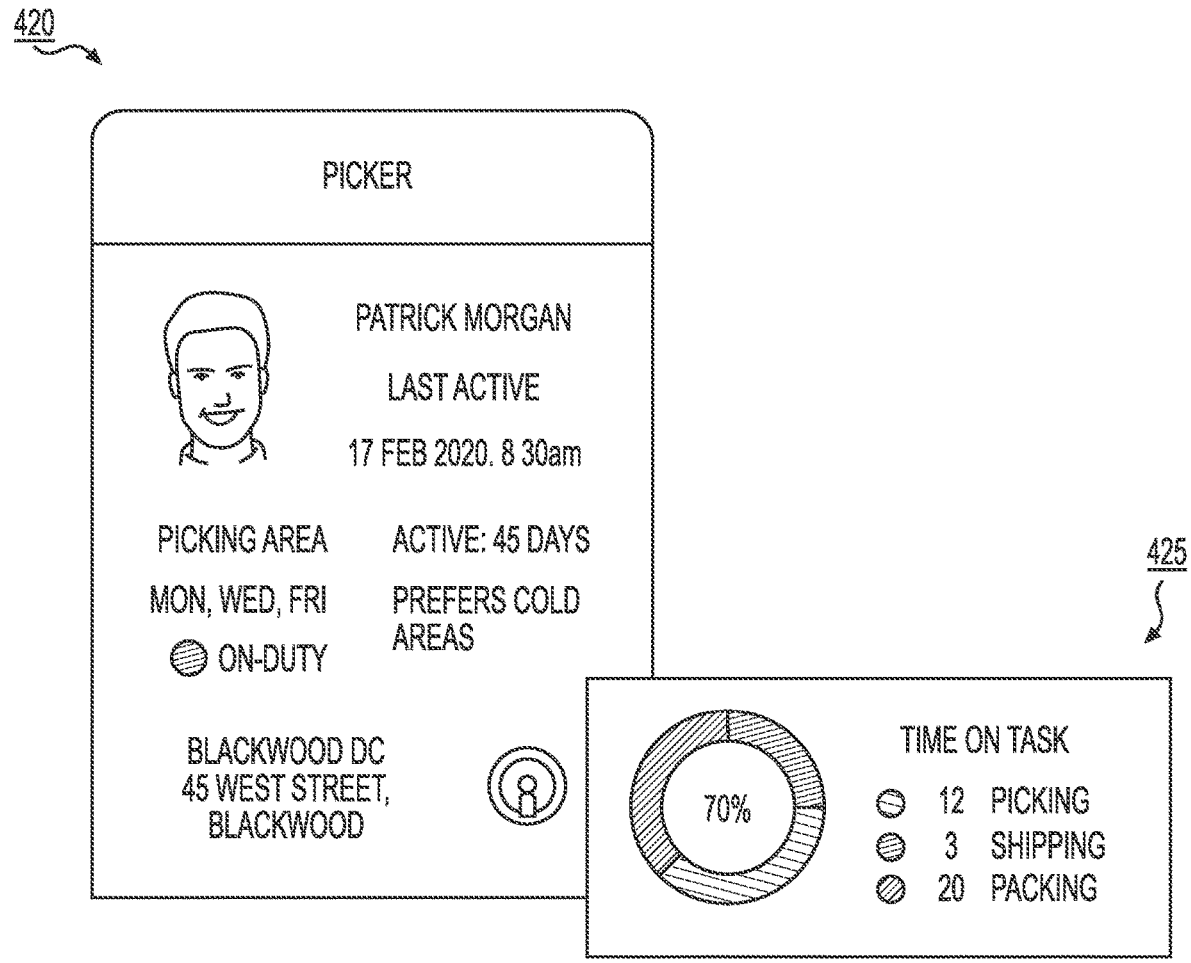
FIG. 4C depicts an example user interface summary dashboard in another mode, according to an exemplary embodiment.

FIG. 4C is an example user interface summary dashboard 430 associated with the worker performance database of EPM control tower 210*a-n*. As shown, dashboard 430 can be in communication with an insight module to present summary information related to a worker scorecard. Through dashboard 430, a user can observe or otherwise track performance metrics of interest, including but not limited to worker productivity, and match preferences of a respective worker to work-related tasks. By so dynamically matching, churn or wasteful time allocation can be minimized, and insights into worker coaching-related needs can be determined. As can be seen, dashboard 430 can present information such as worker name, worker address, worker status (e.g., on duty, off duty, etc.), schedule summary (e.g. at a location on Monday, Wednesday, and Friday), how long the worker has been active in the system, worker preferences, and worker job title.

In some aspects, a user can toggle dashboard 430 to investigate more information related to the user previously summarized in dashboard 430 to initiate presentation of dashboard 435. Dashboard 435 can include more real-time task-related performance metrics, such as specific metrics (e.g., minutes or percentage of shift time) the respective worker has dedicated doing specific tasks (e.g., picking, shipping, packing, etc.) across a period of time (e.g., a shift, a day, a week, a year, an entirety of the worker's time spent with a company, etc.). In some aspects, dashboards 430 and 435 facilitate tracking top performing workers as well as outlier poorer performance performances according to certain metrics (e.g., worker area, specific tasks, time allocation management, etc.). The information presented in dashboards 430 and 435 can be presented in any number of ways, including color coded similar to other previous dashboards of this disclosure.

Figure 5:
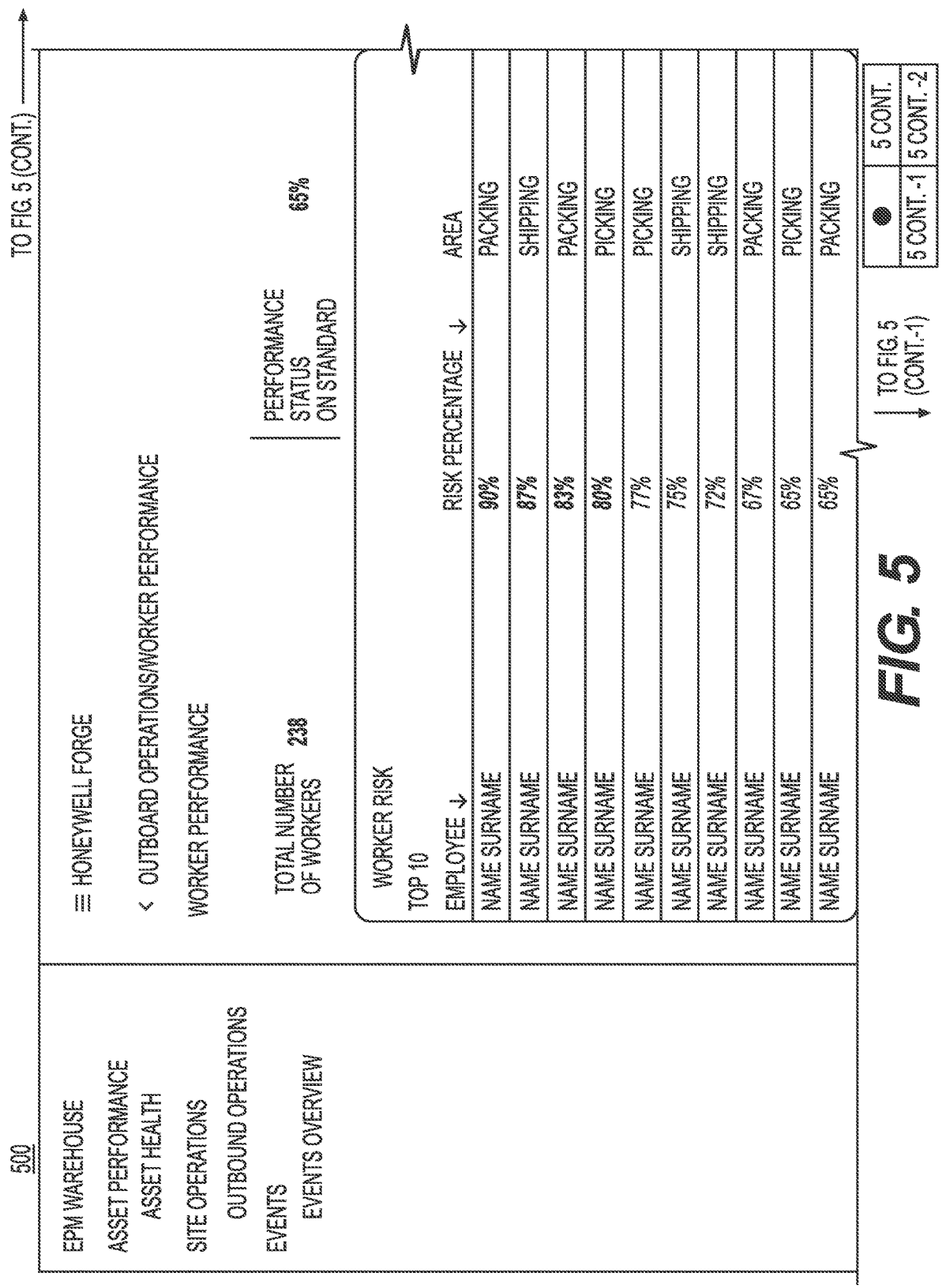
FIG. 5 depicts an example user interface including a plurality of dashboards according to an exemplary embodiment.

FIG. 5 depicts an example user enterprise warehouse management interface 500 including any of the herein disclosed dashboards 410, 420, 430, 435 positioned in a single frame. In certain aspects, each of the dashboards of interface 500 can be positioned as tiles capable of being toggled to enlarge or otherwise accessed by user. Interface 500 can also present sub-dashboards such as ones configured to present work risk summaries (e.g., with names, risk percentage, and worker area), total numbers of workers, performance status indicators, overall labor, labor utilization, and/or the like. Interface 500 can also include a dashboard directed towards summarizing worker opportunities by area and recommendations for potential workers in respective areas. Interface 500 can also include a notification dashboard with filter options, event logs, and a presentation of notifications compliant with user-selected or system-selected notification filter and/or notification settings. In some aspects, interface 500 can present summaries of resources against a set of tasks that need to be executed. For example and without limitation, based on the workflow lifecycle, interface 500 can be configured to transmit to connected workers a queue of one of more tasks based on the operations of the overall system. The queue can be available so that when a respective worker successfully completes a task, one or more subsequent tasks are presented.

Figures 6A, 6B:
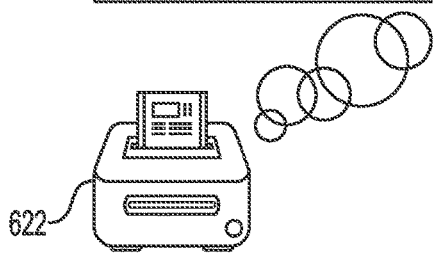
FIG. 6A depicts an example user interface, according to an exemplary embodiment.
FIG. 6B depicts an example alert message, according to an exemplary embodiment.

FIG. 6A depicts an example user interface 610 to create tasks so as optimize worker performance. Specifically, user interface 610 can be used to generate real-time task instructions for employees (e.g., crew members) or any related user based on operations feedback, including human and analytics feedback related to one or more work sites. As can be seen, interface 610 can include automatically and/or manually generating tasks with task-related information, such as a template(s) for task creation, a work site location (e.g., zone, 1, zone 2, etc.), a worker pulldown menu (e.g., team 1, team 2, individual 1, individual 2, etc.), and a priority pulldown menu (e.g., move to top, objective categorizing of a task such as urgent, non-urgent, etc.). In some aspects, user interface 610 can be used to oversee worker execution of a work-related plan (e.g., daily plan, a weekly plan, a monthly plan, a quarterly plan, etc.) so as to encourage and remain present to advise and address issues that prevent employees from completing tasks. In some aspects, user interface 610 is used to optimize workplace performance by automatically assigning and/or scheduling the appropriate tasks for the appropriate employee at the appropriate time (e.g., based on one or more relationships determined as between detected criteria such as employee skills, availability, experience, history, and/or the like).

FIG. 6B depicts an example alert message 620 notifying of an event of interest affecting employee performance. For example, a notification associated with alert message 620 can be pushed to a user interface (e.g., interface 610) to inform that the event of interest has occurred which may impact performance. As can be seen, alert message 620 indicates that trouble has been reported, that a device, such as, for example printer 622 is out of media, a time of the event of interest, to whom the related job tasks have been assigned to resolve, and buttons for related user engagement. For example, message 620 can include a button to dismiss and/or snooze the message 620. Message 620 can also be configured to re-assign tasks(s) associated with the event of interest or otherwise control performance of task(s) associated with the event of interest.

Figure 7:
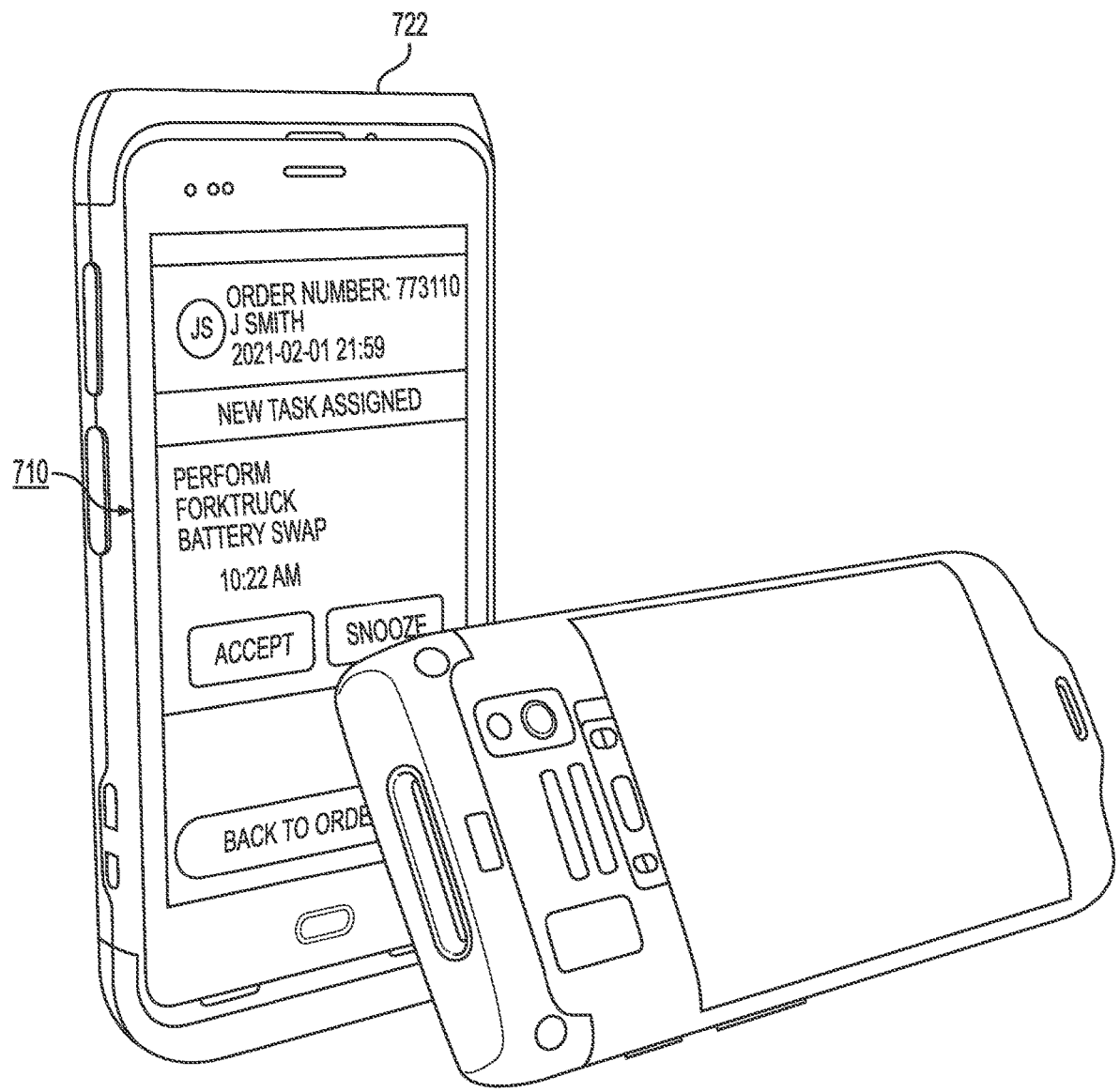
FIG. 7 depicts an example user interface dashboard in a first mode, according to an exemplary embodiment.

FIG. 7 depicts an example user interface 710 for of an example computing device 722. As seen, via user interface 710 one or more tasks can be assigned, created, and/or otherwise communicated to one or more users (e.g., crew member). Such notifications related to a newly assigned task or feedback related to an already-assigned task can include information controls for users to accept, snooze, and/or otherwise interact with a respective task (e.g., propose or execute modifications to a task, work plan, and/or the like).

Figure 8:
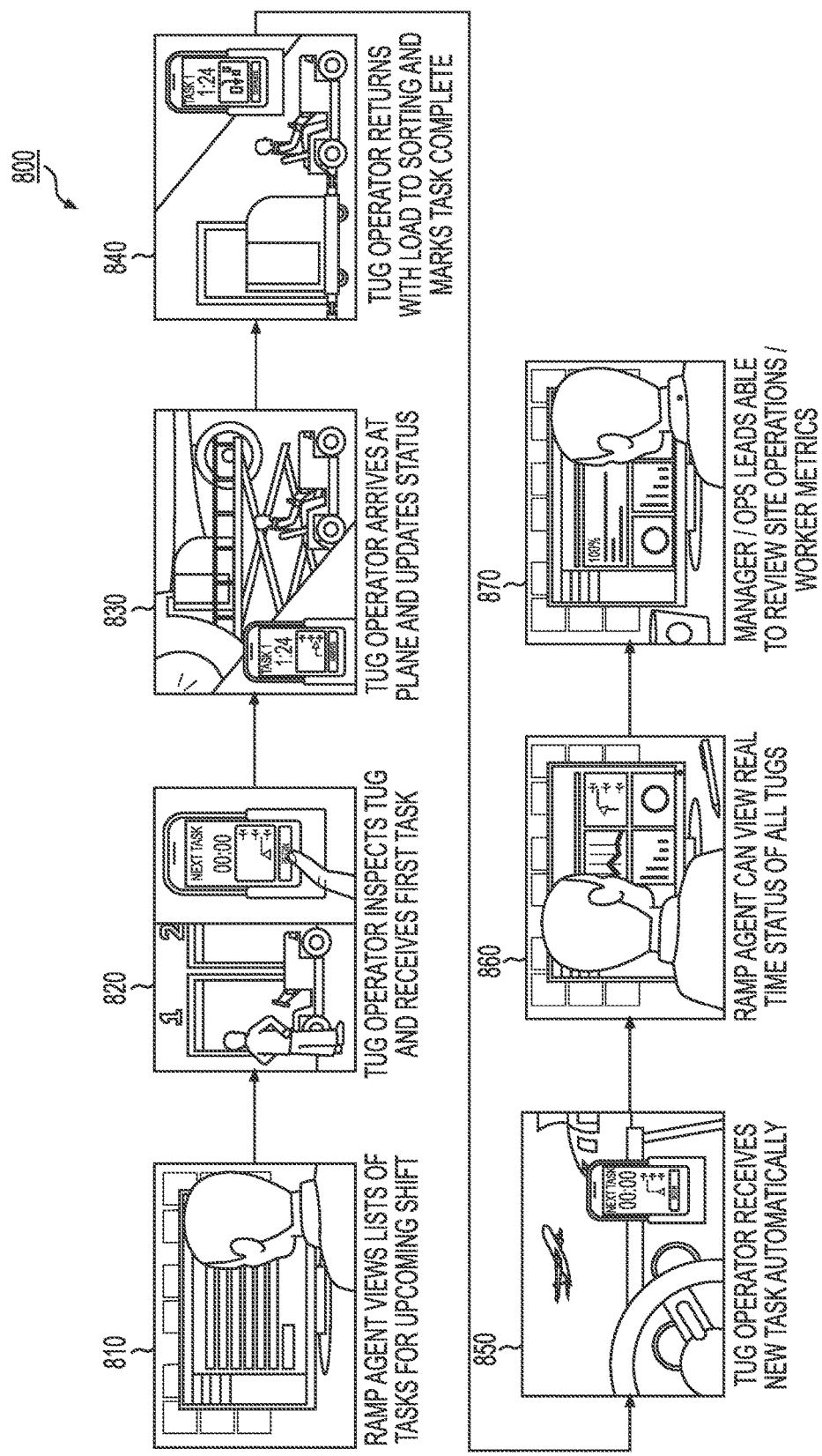
FIG. 8 is a flowchart illustrating a method for managing unplanned tasks, according to an exemplary embodiment.

FIG. 8 is a flowchart illustrating a method 800 for managing unplanned tasks (e.g., tasks of job site(s), area(s) of job site(s), employee(s), group(s) of employees, etc.). In step 810, the method can include viewing, by employee user (e.g., a ramp agent) a list of tasks for a shift (e.g., an upcoming shift). In step 820, the method can include presenting an assigned first task to the user, the assigned task being unexpected (e.g., a tug operator employee can be inspecting a tug and then receive a first task). In step 830, the method can include the employee completing a first subtask (e.g., arriving to a job site associated with the assigned task) and updating status of the assigned task based on a status of the first subtask (e.g., the employee has arrived to the job site). In some aspects, the tug operator employee can arrive to an airplane (e.g., the job site) and the status of the first subtask can be that the tug operator employee has arrived to the airplane. The status can be automatically updated and/or communicated based on information the employee detected or tracked from the computing device of the employee (e.g., GPS data automatically transmitted from a location tracker of the computing device of the employee). In some aspects, the status can be manually updated and/or communicated (e.g., the employee can manually enter into a computing device that she has arrived to the job site).

In step 840, the method can include the employee completing a second subtask (e.g., arriving to a second job site associated with the assigned task) and updating status of the assigned task based on a status of the second subtask (e.g., the employee has arrived to the second job site to sort). In some aspects, the tug operator employ can return with a load from the first job site and the status of the second subtask can be that the tug operator employee has returned from the airplane with the load for sorting or that that the load has already been sorted. The status of the second subtask can be automatically updated and/or communicated based on data of the computing device of the employee and/or any items associated with the second subtask (e.g., GPS data automatically transmitted from the computing device of the employee, tracking information of any items associated with the second subtask, etc.). In some aspects, the status can be manually updated and/or communicated (e.g., the employee can manually enter into a computing device that she has returned, that the load has been sorted, etc.). In some aspects, task updates can be semi-automated and/or automated based on input from one or more feedback mechanisms such as voice input, scanning, device usage, network activity, location-based events, visual recognition events, etc.

In some aspects, completion of the first and second subtasks can automatically mark the assigned task as being completed. In this respect, in step 850, the method can include upon completion of the first assigned task, automatically assigning a second assigned task to the employee (e.g., the tug operator employee receives a new task since the aforementioned load has been retrieved from the airplane, sorted, and returned).

In step 860, the method can include viewing, by a second employee (e.g., an employee other than the tug operator such as a ramp agent), a real-time status of all other employees of a team associated with the first employee (e.g., other tug operators of the first tug operator's team).

In step 870, the method can include reviewing, by a third employee (e.g., an employee who is a manager or OPS lead other than the tug operators), a real-time status of all task operations of the job site and employee task performance metrics.

Figure 9:
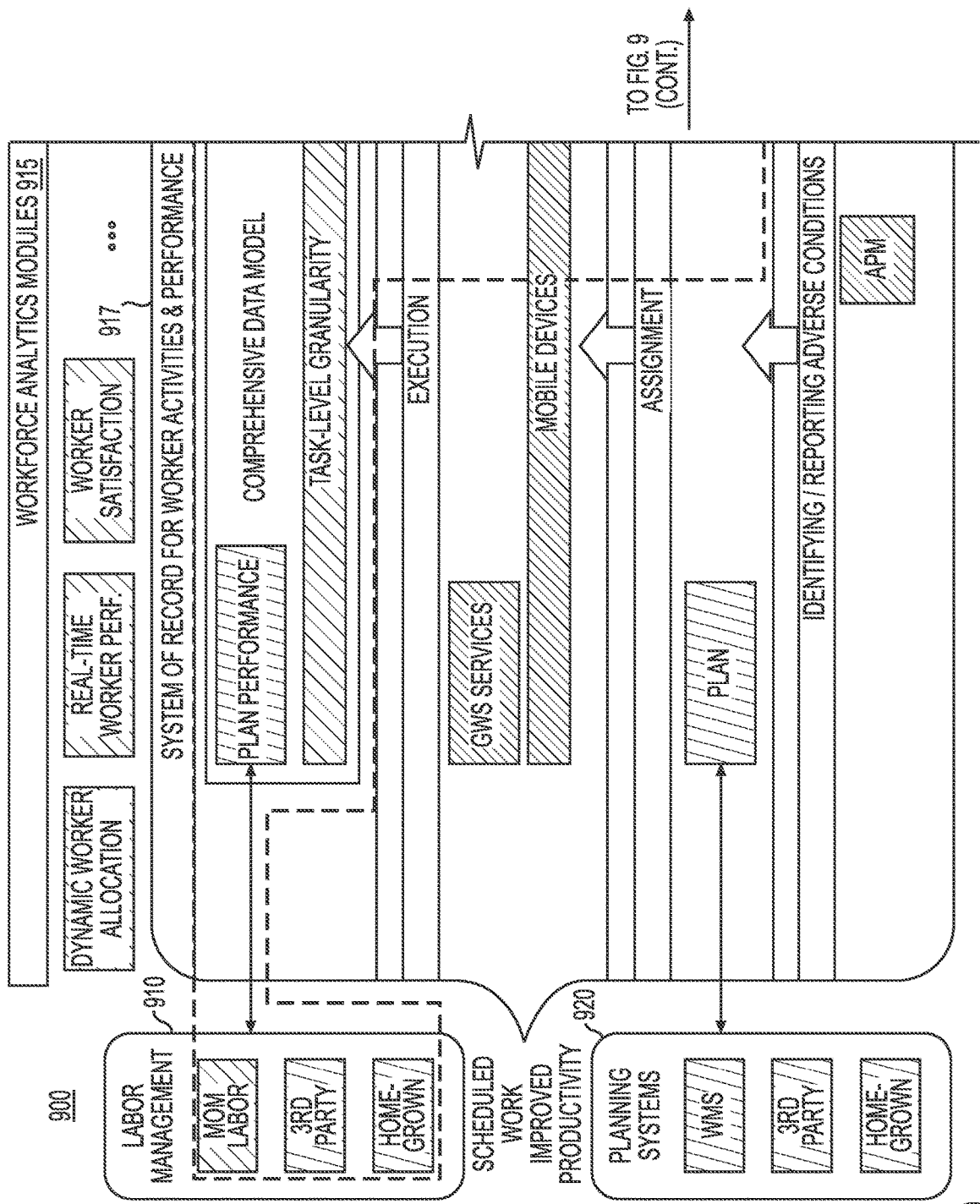
FIG. 9 is a diagram of architecture of a connected warehouse system of this disclosure.
Figure 9:
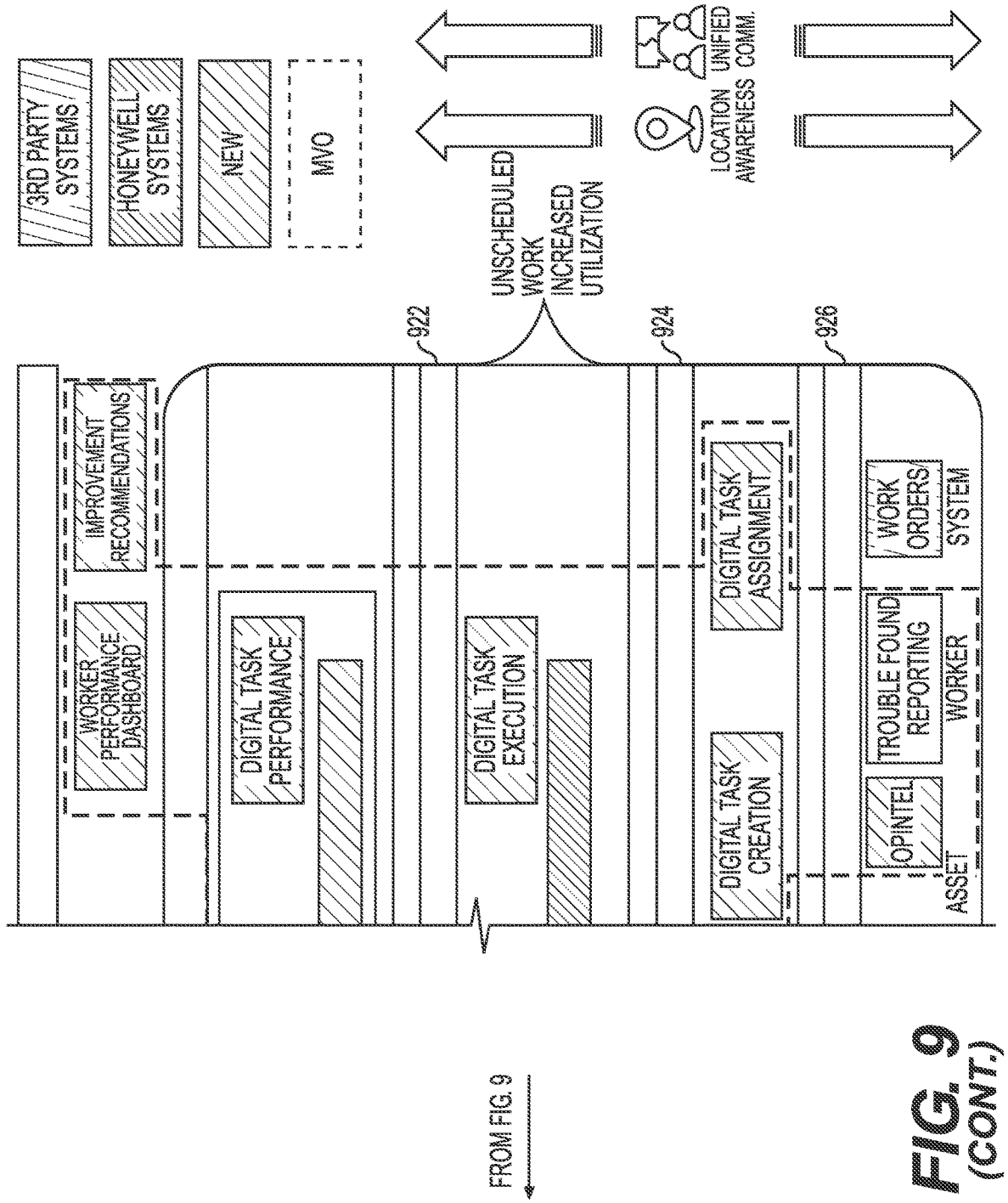

FIG. 9 is a diagram of architecture associated with of a connected warehouse system 900 of this disclosure. System 900 can include workforce analytic modules 915, including but not limited to modules for dynamic work allocation, real-time worker performance metrics, worker satisfaction, etc. Workforce analytic modules 915 can also include one or more worker performance dashboards 923 and improvement recommendations 925. Improvement recommendations 925 can be for training, rewarding, coaching, engagement, etc. opportunities to maximize worker retention, performance, and overall work operations In certain aspects, worker performance dashboards 923 and improvement recommendations 925 can be updated (e.g., in real-time) by a system 917 of record for worker activities and performance. System 917 can be in communication with workforce analytic modules 915. System 917 can improve schedule worked productivity via labor management module 910 and planning systems module 920. Specifically, management module 910 can include one or more discrete components (e.g., components to manage manufacturing operations management (MOM) labor, 3rd party activities, as well as homegrown activities) that in real-time communicate with a comprehensive data model of system 917. The comprehensive data model of system 917 can include a plan performance module bi-directionally coupled to labor management module 910. The comprehensive data model of system 917 can also include modules with digital task performance and task-level granularity. In some aspects, the plan performance module can include a database of worker digital task performance and task-level granularity (e.g., showing discrete subtasks of a task or granular performance metrics of a respective worker task).

In practice, a layer 926 for identifying and reporting adverse conditions can be included in system 917. Layer 926 can include an asset performance manager (APM) as well as systems to manage worker orders. In some aspects, layer 926 can include an operation intel manager and trouble-found reporting system that collectively work to enable layer 926 to communicate with aspects of assignment layer 924 downstream thereof. Layer 926 can include a plan system in bi-directionally coupled to planning systems module 920, including but not limited to warehouse management systems (WMS), third party systems, and the like. The operation intel manager and trouble-found of assignment layer 926 can communicate with digital task creation and digital task assignment systems of assignment layer 924. Assignment layer 924 in turn can communicate with aspects of execution layer 922 downstream thereof.

Layer 922 can include or be coupled to one or more mobile devices (e.g., mobile devices of users and/or personnel associated therewith including employees, managers, and personnel of third parties). Layer 922 can also include guided work software (GWS) systems. In some aspects, the digital task creation and digital task assignment systems of assignment layer 924 can be in communication with the mobile devices of layer 922 as well as a digital task execution system of layer 922. In some examples, mobile devices of layer 922 as well as a digital task execution system of layer 922 can communicate with the task level granularity system, the plan performance system, and digital task performance system of the comprehensive data model of system 917 to dynamically update worker performance dashboard 923 and improvement recommendations 925.

Figure 10:
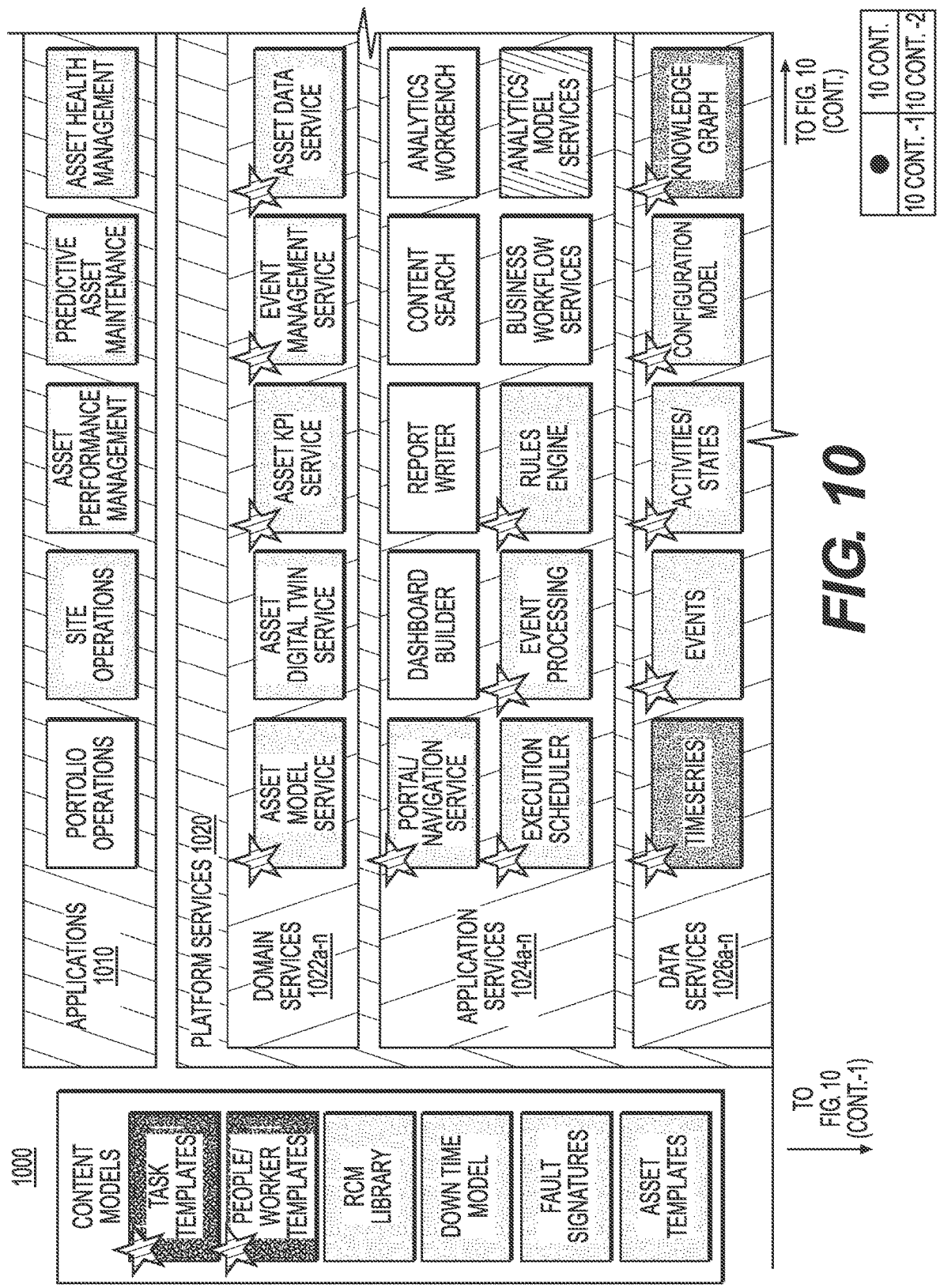
FIG. 10 is a diagram of architecture of a connected warehouse system of this disclosure.
Figure 10:
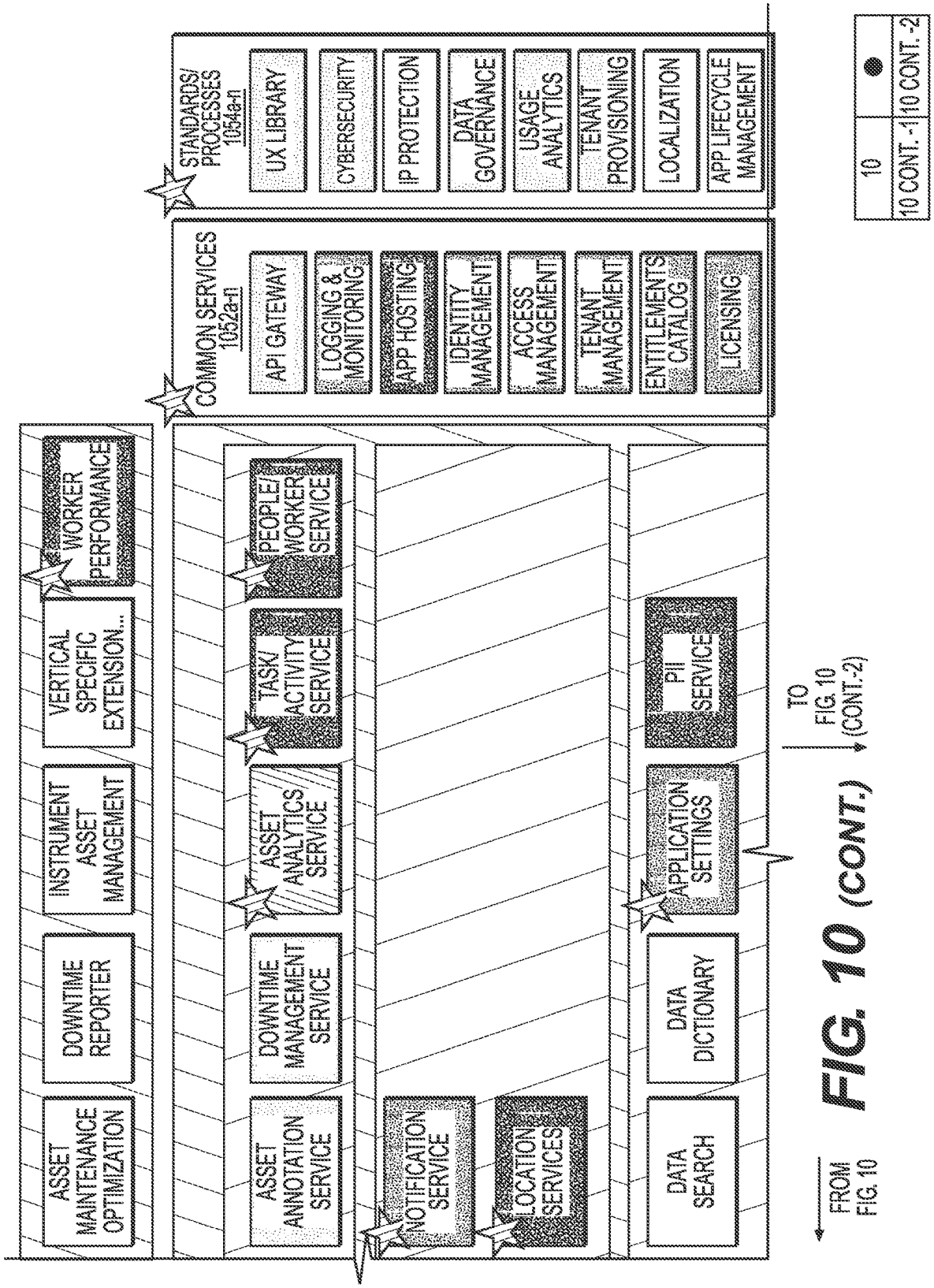

FIG. 10 is a diagram of architecture of a connected warehouse system 1000 of this disclosure. System 1000 can be a multi-layered system including an applications layer 1010, a platform services layer 1020, a common services layer 1052*a-n*, a standards and processes layer 1054*a-n*, a connectivity services layer 1040, a data sources layer 1048*a-n*, and an enterprise systems layer 1050*a-n*.

Applications layer 1010 can include a plurality of components such as applications for portfolio operations, site operations, asset performance management, predictive asset maintenance, asset health management, asset maintenance optimization, downtime reporter, instrument asset management, vertical specific extension, and worker performance.

Platform services layer 1020 can be in communication with applications layer 1010 and include a plurality of system components, including domain services 1022*a-n*, application services 1024*a-n*, data services 1026*a-n*, managed storage 1028*a-n*, and data ingestion 1030*a-n*. Domain services 1022*a-n* can include modules and/or components for asset model service, asset digital service, asset key performance indicator (KPI) service, event management service, asset data service, asset annotation service, downtime management service, asset analytics service, task/activity service, and people worker service. Preferably, domain services 1022*a-n* includes asset analytics service systems, task/activity service systems, and people worker service systems.

Application services 1024*a-n* can include modules and/or components for portal navigation service, dashboard builder, report writer, content search, analytics workbench, notification service, execution scheduler, event processing, rules engine, business workflow services, analytics model services, and location services. Some or all of components of application services 1024*a-n* can be in communication with applications of layer 1010.

Data services 1026*a-n* can include modules and/or components for time series, events, activities and states, configuration model, knowledge graph, data search, data dictionary, application settings, and personal identifying information (PII) services. Managed storage services 1028*a-n* can include databases for time series, relational, document, blob storage, graph databases, file systems, real-time analytics databases, batch analytics databases, and data caches. Managed storage services 1030a-n can include modules and/or components for device registration, device management, telemetry, command and control, data pipeline, file upload/download, data prep, messaging, and IoT V3 connector.

Connectivity services layer 1040 can include edge services 1042a-n, edge connectors 1044a-n, and enterprise integration 1046a-n. Edge services 1042a-n can include modules and/or components for connection management, device management, edge analytics, and execution runtime. Edge connectors 1044a-n can include OPC unified architecture (OPC UA), file collectors, and domain connectors. Enterprise integration 1046a-n can include modules and/or components for streaming, events, and/or files. Data sources layer 1048a-n can include modules and/or components for streaming, events, and/or files, as well as time series.

In some aspects, common services 1052a-n can include one or more API gateways as well as components for logging and monitoring, application hosting, identify management, access management, tenant management, entitlements catalogues, licensing, metering, subscription billing, user profiles, and/or secret store.

In some aspects, standards and processes 1054a-n can include one or more UX libraries as well as components for cybersecurity, IP protection, data governance, usage analytics, tenant provisioning, localization, app lifecycle management, deployment models, mobile app development, and/or marketplace.

Figure 11:
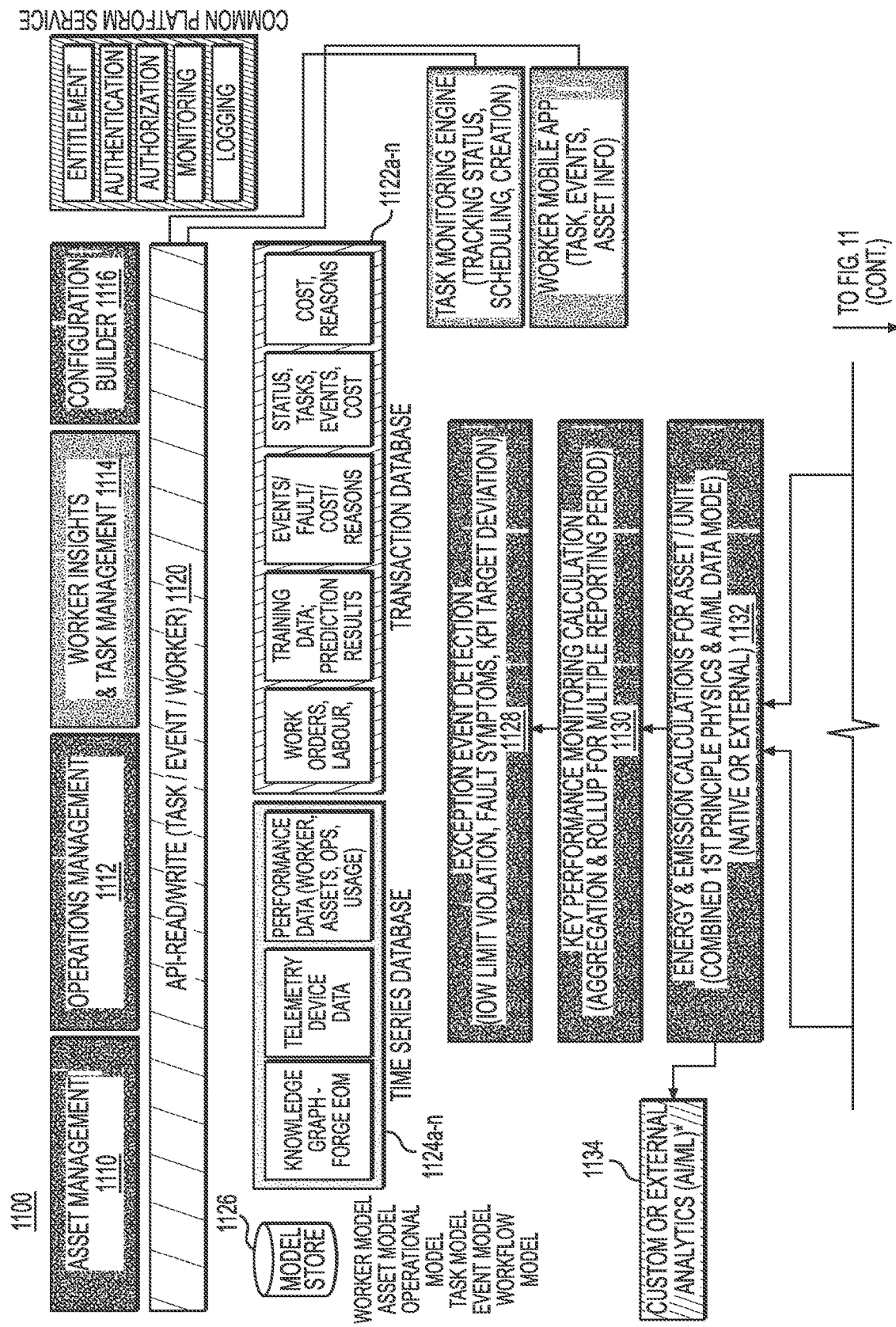
FIG. 11 depicts a schematic block diagram of a framework of a platform of a connected warehouse system.
Figure 11:
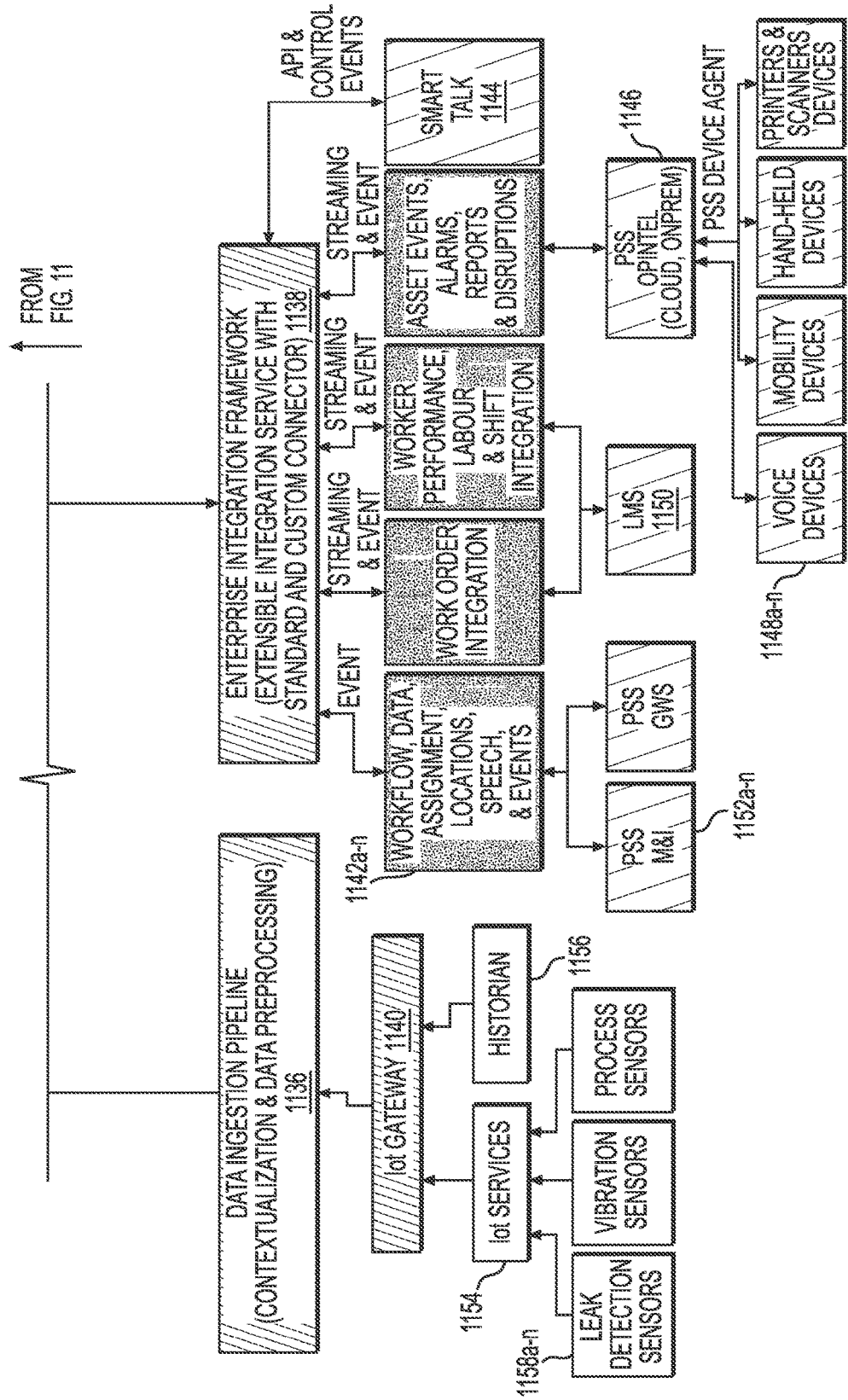

FIG. 11 depicts a schematic block diagram of a framework of a platform of a connected warehouse system 1100. System 1100 can include an asset management system 1110, operations management system 1112, worker insights and task management system 1114, and configuration builder system 1116. Each of systems 1110, 1112, 1114, and 1116 can be in communication with API 1120, whereby API 1120 can be configured to read/write tasks, events, and otherwise coordinate working with workers of system 1100. API 1120 can include a task monitoring engine configured to track status, schedule, and facilitate task creation. API 1120 can present or otherwise be accessed via a worker mobile application (e.g., a graphical user interview on a computing device) to similarly present and manage operations related to tasks, events, and asset information.

API 1120 can be communication with model store 1126 whereby model store 1126 can include models such as worker models, asset models, operational models, task models, event models, workflow models, and the like. API 1120 can be communication with time series databases 1124a-n and transaction databases 1122a-n. Time series databases 1124a-n can include knowledge databases, graph databases, as well as extensible object models (EOMs). Transaction databases 1122a-n can include components and/or modules for work orders, labor, training data, prediction results, events, fault, costs, reasons, status, tasks, events, and reasons.

Each of databases 1124a-n, 1122a-n can be in communication with analytics model 1134, which can be a machine learning model to effectively process, analyze, and classify operations of system 1100. Model 1134 can be a trained machine learning system having been trained using a learned set of parameters to predict one or more learned performance parameters of system 1100. Learned parameters can include but are not limited to predictive asset maintenance of a connected warehouse, asset health management, asset maintenance optimization, worker downtime reporter, instrument asset management, vertical specific extension, and worker performance. One or more corrective actions can be taken in response to predictions rendered by model 1134. Model 1134 can be trained with a regression loss (e.g., mean squared error loss, Huber loss, etc.) and for binary index values it may be trained with a classification loss (e.g., hinge, log loss, etc.). Machine learning systems that may be trained include, but are not limited to convolutional neural network (CNN) trained directly with the appropriate loss function, CNN with layers with the appropriate loss function, capsule network with the appropriate loss function, Transformer network with the appropriate loss function, Multiple instance learning with a CNN (for a binary resistance index value), multiple instance regression with a CNN (for a continuous resistance index value), etc.

In certain aspects, databases 1124a-n and 1122a-n can operate together to perform exception event detection 1128. Exception event detection 1128 can utilize data from one or more data sources to detect low limit violations, fault symptoms, KPI target deviations, etc. In certain aspects of exception event detection 1128, a data ingestion pipeline 1136 and enterprise integration framework 1138 can exchange information for energy and emission calculations per asset/units of system 1100. Pipeline 1136 can utilize contextual data and data preprocessing while framework 1138 can include extensible integration service with standard and customer connectors.

In certain aspects, an IoT gateway 1140 can be communicatively coupled to pipeline 1136. IoT gateway 1140 can be communicatively coupled to IoT devices 1154 such as sensors 1158a-n, including leak detection sensors, vibration sensors, process sensors, and/or the like. IoT gateway 1140 can also be in communication with data historian 1156 including historical data related to the warehouse.

Framework 1138 can be in communication with event manager modules 1142a-n, including workflow module, work order integration module, worker performance module, asset event module, and the like. For events, the workflow module can be configured to bidirectionally communicate with framework 1138 and components of process workflow data 1152a-n, including Process Safety Suite (PSS) maintenance and inspection (M&I) and PSS GWS. For event streaming, work order integration module and worker performance module can both be configured to bidirectionally communicate with framework 1138 and labor management systems (LMS) 1150. In some aspects, for event streaming asset event module can also be configured to bidirectionally communicate with PSS operational intelligence systems 1146 and framework 1138. PSS operational intelligence systems 1146 in turn can be cloud-based and/or on premises and be in bidirectional communication with devices 1148a-n, including voice devices, mobility devices, hand-held devices, printers, scanners, and/or the like. Framework 1138 can also be in communication with start talk module 1144 for corresponding API and event control.

In aspects of system 1100, pipeline 1136 and framework 1138 work together to perform step 1132 to calculate energy and emission calculations for assets and/or associated units. Model 1134 can be used in performing step 1132 as well as other native and/or external models connected therewith, whereby step 1132 can utilize data received from pipeline 1136 and framework 1138.

Upon completing step 1132, key performance monitoring calculations can be performed in step 1130. Step 1130 can be performed based on energy and emission calculations from step 1132 by aggregating and rollup across one or multiple reporting periods. Upon performing step 1130, the aforementioned event exception detection step 1128 can be performed to detect exception events. In some aspects, step 1128 can be performed based on the key performance monitoring calculations of step 1130.

Figure 12A:
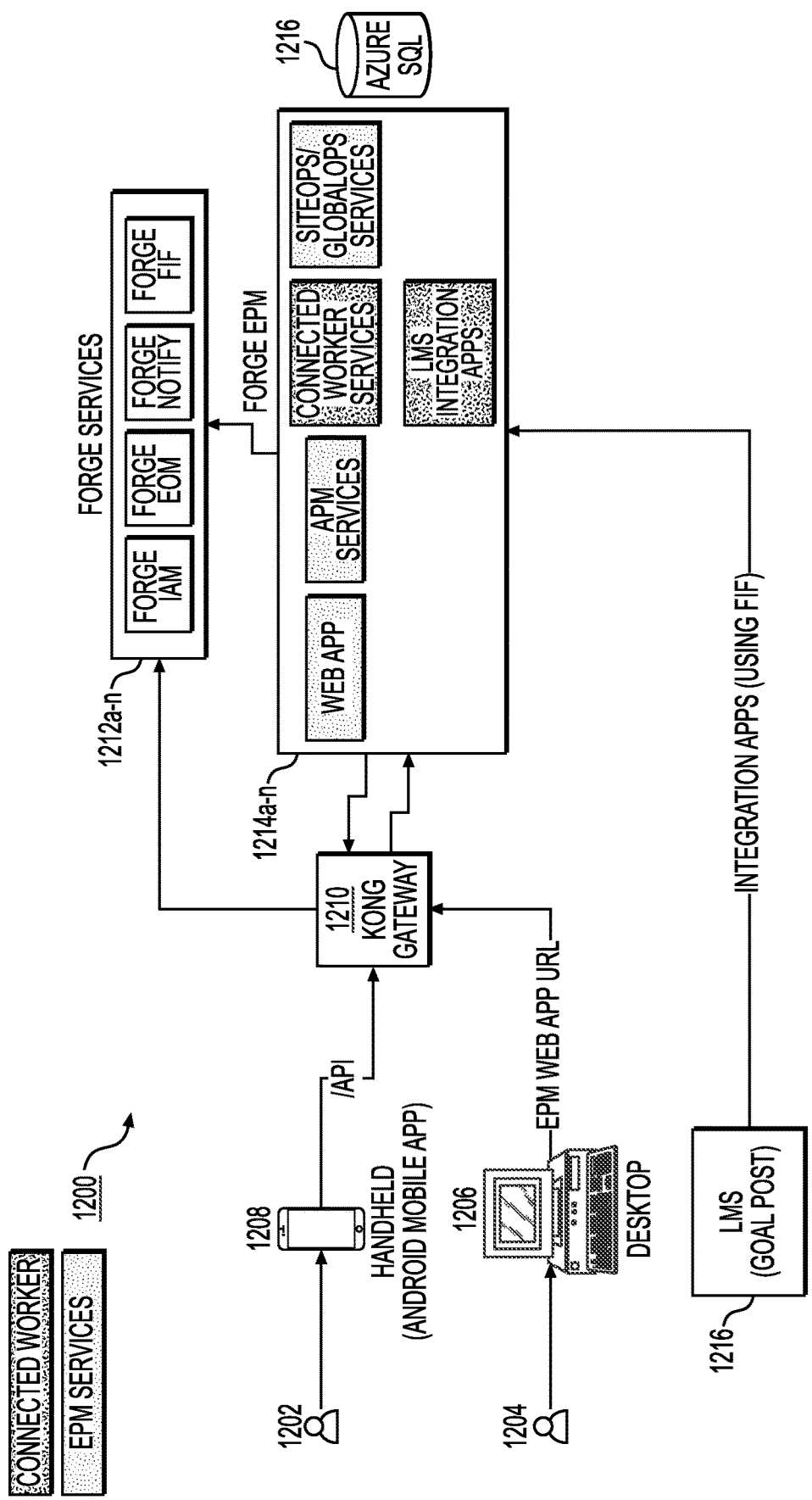
FIG. 12A depicts an exemplary diagram of a data flow of a connected warehouse, according to one or more embodiments.

FIG. 12A is a diagram of data flow 1200 of a connected warehouse system, including one with connective workers and performance management (EPM) service systems. In FIG. 12A depicts an exemplary diagram of a data flow 1200, according to one or more embodiments. In step 1204, an operator and/or engineer may use a computing device 1206 to manage system performance through a user interface (e.g., a web-based or browser-based application) using system gateway 1210, which can be a cloud based. In step 1202, a user (e.g., worker, manager, and/or the like) may use an app in a computing device 1208 (e.g., mobile device such as a tablet or smart phone or any personal computing device) via an API to communicate and exchange data with gateway 1210.

Warehouse system services 1212a-n can be configured in communication with gateway 1210 (e.g., receive data from gateway 1210 from steps 1202 and 1204). Services 1212a-n can be configurable to communicate and/or update in real-time functions such as identify and access management (IAM), system extensible object model (EOM), notifications, fire and gas instrumented function (FIF), etc. Performance management system 1214a-n can be configured to transmit data to warehouse system services 1212a-n while receiving data from LMS 1216. Based on said data from LMS 1216, real-time adjustments can be determined for a labor management plan associated with the warehouse and/or workers. In some aspects, the labor management plan can be updated by system 1214a-n being in bidirectional communication with gateway 1210. System 1214a-n can include or otherwise be in communication with corresponding web apps, asset performance management (APM) services, connected worker services, LMS integration applications, site operation services, and global operation services. System 1214a-n can be connected to one or more cloud-based databases (e.g., azure SQL 1216). One or more components of system 1214a-n can be part of computing devices and/or sensors associated with workers connected to the system.

LMS 1216 can be configured to control labor costs, track performance, and predict one or more parameters associated with performance (e.g., project fulfillment execution) and transmit and/or otherwise present such information in LMS system integration applications (e.g., using FIF). In turn, system 1214a-n can configured to consume data from LMS 1216, gateway 1210, devices 1208 and 1206, and services 1212a-n to deliver one or more inferences to end users (e.g., one or more actions that the end-user can take or a corresponding employee or employees associated with one or more tasks) to result in changing a warehouse operation, such as warehouse operation savings. Warehouse operation savings can be directed towards safety, maintenance, performance, resource conservation, deliverable management, inventory management, etc.). An actionable update (e.g., a sync) may then be made to data flow 1200.

Figure 12B:
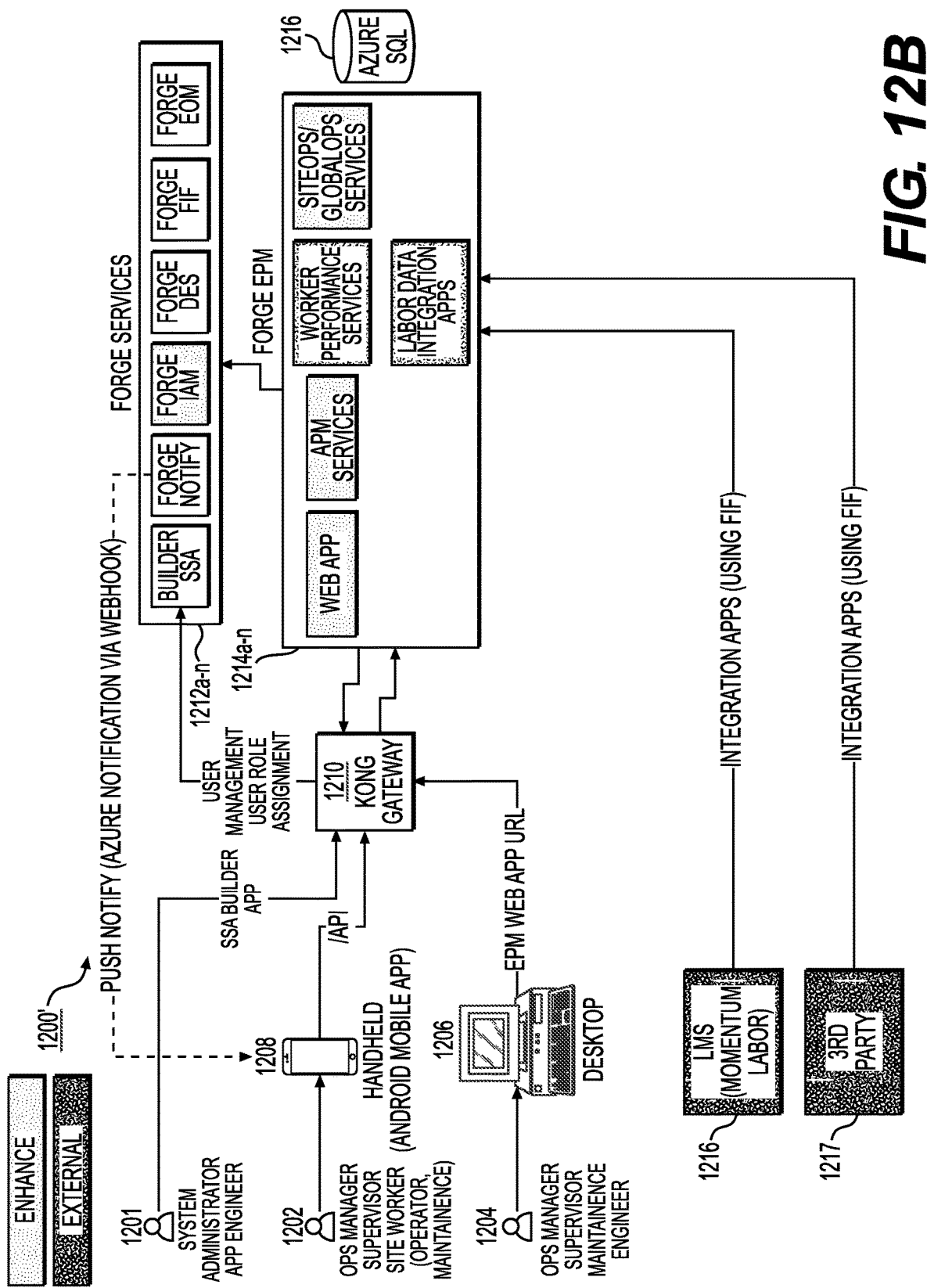
FIG. 12B depicts an exemplary diagram of a data flow of a connected warehouse, according to one or more embodiments.
Figure 13:
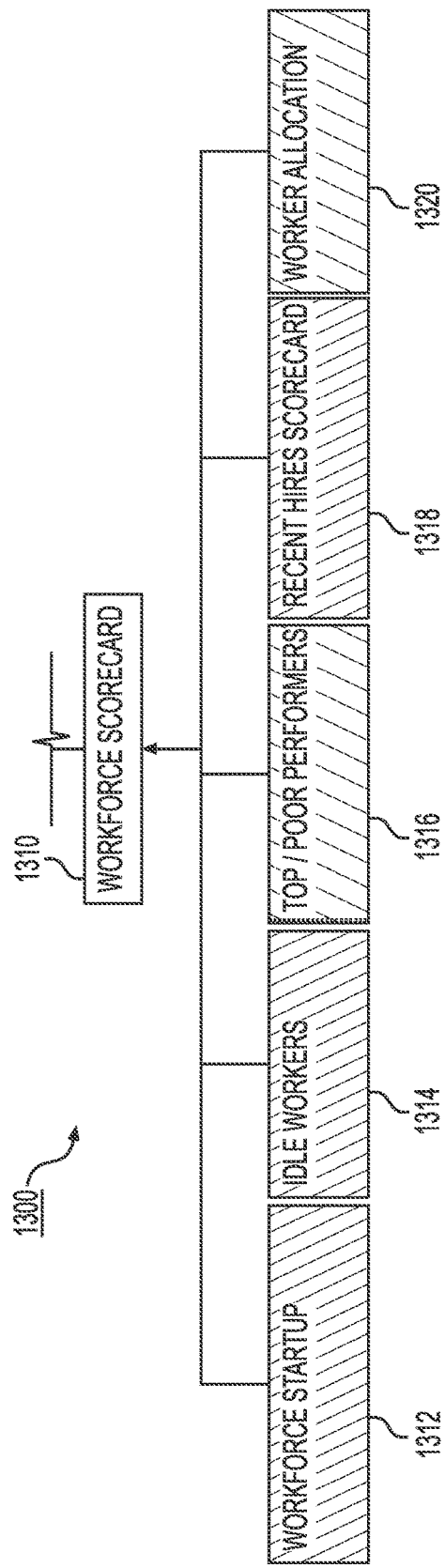
FIG. 13 is a diagram of architecture of a workforce scorecard dashboard of a connected warehouse system of this disclosure.

FIG. 12B is a diagram of data flow 1200' of a connected warehouse system. In addition to previous steps 1202 and 1204, data flow 1200' provides step 1201 in which a system administrator and/or application engineer may manage system performance through a user interface (e.g., a web-based or browser-based application) using system gateway 1210, which can be a cloud based. In data flow 1200', one or more services of services 1212a-n (e.g., such as the notifications module) can push messages or otherwise push notify (e.g., azure notification via webhook) from services 1212a-n to device 1208. In some aspects, data flow 1200' provides that performance management system 1214a-n can receive data from LMS 1216 and one or more third party systems 1217. Based on said data from LMS 1216 and one or more third party systems 1217, real-time adjustments can be determined for a labor management plan associated with the warehouse and/or workers. In some aspects of data flow 1200', the labor management plan can be updated by system 1214a-n being in bidirectional communication with gateway 1210. FIG. 13 depicts architecture 1300 of a workforce scorecard dashboard 1310 of a connected warehouse system of this disclosure. In some aspects, scorecard dashboard 1310 can include objective information related to one or more worker performance parameters. For example, based on information from an insight module of the connected warehouse, scorecard dashboard 1310 can present a smart warehouse score on a numeric scale or present a color rating summarizing workforce performance scores in real-time. It is understood that an insight module of or associated with scorecard dashboard 1310 can include aspects of any herein disclosed connected warehouse, including connected warehouse system 1000 and its warehouse system services 1212a-n, performance management system 1214a-n, LMS 1216, gateway, and/or the like, whereby data can be aggregated from corresponding sensor devices, worker computing devices, and connected systems to calculate one or more worker performance scores.

By way of example and without limitation, scorecard dashboard 1310 can also be communication with aspects of previously discussed systems, such as time series databases 1124a-n and transaction databases 1122a-n so that these databases can operate together to perform exception event detection 1128 to calculate worker performance and related scores (e.g., exception event detection 1128 can utilize data from one or more data sources to detect low limit worker performance violations, fault or anomaly worker performance symptoms, KPI target deviations, etc.). In certain aspects of exception event detection 1128, a data ingestion pipeline 1136 and enterprise integration framework 1138 can exchange information for energy and emission calculations per asset/units of system 1100. Pipeline 1136 can utilize contextual data and data preprocessing while framework 1138 can include extensible integration service with standard and customer connectors.

Any of the herein disclosed computer systems can provide operation of the smart warehouse score system associated with scorecard dashboard 1310. One or more databases associated with workers, tasks, teams of workers, the warehouse, and the like can be provided at the job site (e.g., warehouse) or remotely (e.g., via the cloud) for memory needs such as functions of scorecard dashboard 1310. Sensor devices of one or more areas and/or assets of the warehouse may be connected therewith and/or with a corresponding insight module along with worker computing device actively sensing information from respective workers. Changes in scorecard dashboard 1310 may reveal deltas or changes so that the system or system user (e.g., shift manager) can take action preemptively and/or in real-time in response to such changes and/or performance anomalies.

In some aspects, workforce startup module 1312 can be included with scorecard dashboard 1310. Scorecard 1312 can in certain aspects be indicated in a worker dashboard, whereby notifications related to one or more anomalies can be transmitted to supervisors (e.g., if worker(s) did not start work after a scheduled start time following signing into a job site, or if worker(s) did not start one or more tasks after returning from a break, etc.). Module 1312 can receive and aggregate data from the sensor devices of the respective job site (e.g., warehouse) as well as area(s) within the job site. Module 1312 can also receive and aggregate data from worker the computing devices of or otherwise connected to workers (e.g., worker computing devices such as mobile devices or other personal computing devices, wearable biometric devices, smart badges, etc.). Module 1312 can track one or more workers or one or more teams of workers to determine whether progress at the start of a task (e.g., at the beginning of a shift or returning from a break) is below, at, or exceeding task expectations so that performance can be optimized.

For example, at the beginning of a shift or returning from a break, it can be common for worker(s) to perform tasks at a rate slower or otherwise less efficient than an optimized and/or expected rate. The system can analyze the aggregated information and via module 1312 present feedback so that the system and/or system user(s) can in real-time monitor task(s) to determine whether tasks at startup are below, at, or exceeding task expectations and corrective action(s) can be promptly taken. For example, a shift manager and/or another worker in a team of workers can be notified, or the respective worker herself can be notified, that startup task performance is below the expected rate and one or more corrective actions of solving problems of the respective worker can be promptly initiated. Corrective actions can include encouraging the respective worker (e.g., with incentivizing compensation, bonuses, etc.), providing a corrective task, inviting another user(s) to help the respective user, and the like. In some aspects, information of module 1312 can be transmitted directly to shift managers as well as other managerial users (e.g., shift supervisor, site operations manager, etc.).

In some aspects, an idle worker scorecard 1314 can be included with scorecard dashboard 1310. Similar to module 1312, scorecard 1314 can receive and aggregate data from the sensor devices and worker the computing devices. Scorecard 1314 can track one or more workers or one or more teams of workers to view all on-shift workers who have not scanned or otherwise provided a task update (e.g., worked tasks, scanned task, completed task, etc.) in a predetermined amount of time (E.g., the previous 5 minutes, the previous 10 minutes, the last hour, a duration of the current shift).

In an associated user interface, an idle worker dashboard view can be provided including the amount of time related to the task update and including visible filters. This amount of time can be automatically or manually updated by the end user (e.g., adjusted to current day, current week, current month, current year, or any previous period of time). In the associated user interface of scorecard 1314, information related to idle workers can be readily presented including but not limited to the number of workers currently idle, of the number of workers who may be repeated idle workers, and a running calculation of total time lost to idle time across a period of time (e.g., the past day, the past week, the current shift, the past month, etc.). Scorecard 1314 can also include a trend number of idle workers as well as predicted idle workers according to current information aggregated from corresponding sensor and worker computing devices in comparison to idle worker historical information.

In some aspects, a top/poor performer scorecard 1316 can be included with scorecard dashboard 1310. Similar to scorecards 1312, 1314, scorecard 1316 can similarly receive and aggregate data from the sensor devices and worker computing devices. Scorecard 1316 can identify outlier performers (top performers, poor performers) so that responsive action can be taken (e.g., rewarding action, encouragement action, etc.). In some aspects, such outlier performers can be determined by comparing performance parameters against others (e.g., in a peer comparison view to compare peers in a respective team, members of other teams, etc.). Performance parameters can include task type, worker level (e.g., seniority related to others, worker certifications, etc). In some aspects, scorecard 1316 can include and continually provide dynamically update lists of top performers and poor performers (e.g., top 5 and bottom 5 workers) based on performance parameters such as overall shift performance, on-standard performance, effectiveness at a respective task or sub-task, as well as engagement.

In some aspects, a recent hire scorecard 1318 can be included with scorecard dashboard 1310. Similar to scorecards 1312, 1314, 1316, scorecard 1318 can similarly receive and aggregate data from the sensor devices and worker computing devices. Scorecard 1318 can identify and provide insights for recently hired workers so that responsive action can be taken (e.g., provide onboarding training, training for a skill or task that the respective recent hire needs support with based on analytics associated with task performance by the respective recent hire). This is particularly advantageous since recent hires are typically the most likely to leave a company, scorecard 1318 provides a prompt, efficient, and results-oriented solution to in real-time determine and present recent-hire worker performance insights and to both provide corrective actions as well as maintain levels of engagement and encouragement for recent hire retention.

In some aspects, a worker allocation scorecard 1320 can be included with scorecard dashboard 1310. Similar to scorecards 1312, 1314, 1316, 1318, scorecard 1320 can similarly receive and aggregate data from the sensor devices and worker computing devices. Scorecard 1320 can monitor and provide insights for worker allocation. In certain aspects, scorecard 1320 can provide visibility related to which workers have arrived for shifts, how each department of a worksite is performing related to worker allocation and status of arrived workers, and present this information relative to expected worker allocation, expected worker performance, and/or status of related tasks. Upon monitoring and determining that allocation anomalies are present or trending to be present, corrective actions can be recommended and/or taken, including practical allocation adjustments to adapt to allocation variations as they occur. Other scorecards, modules, dashboards, and/or related databases are contemplated for use or inclusion with scorecard dashboard 1310.

Figure 14:
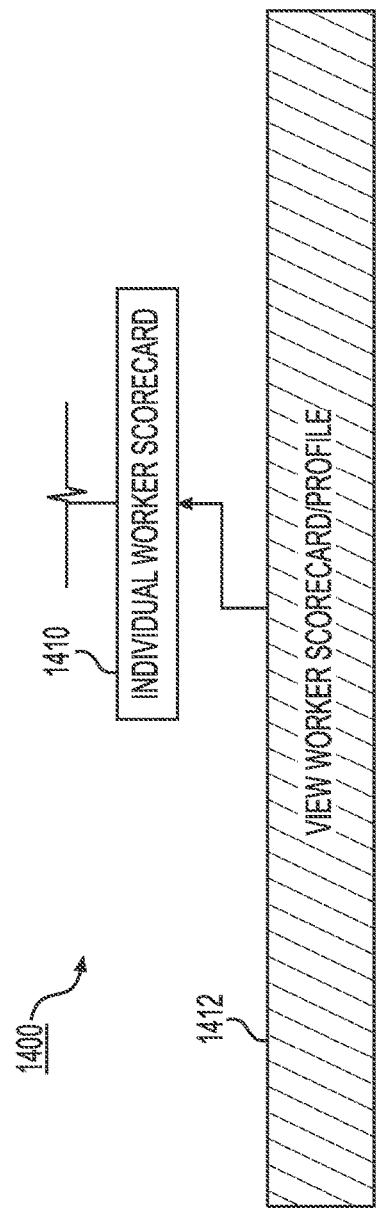
FIG. 14 is a diagram of architecture of an individual worker scorecard dashboard of a connected warehouse system of this disclosure.

FIG. 14 depicts architecture 1400 of an individual scorecard dashboard 1410 of a connected warehouse system of this disclosure. In some aspects, scorecard dashboard 1410 can include objective information related to one or more individual worker performance parameters. For example, scorecard dashboard 1410 can present an individual worker score on a numeric scale or present a color rating summarizing workforce performance in real-time.

Any of the herein disclosed computer systems, including the connected warehouse systems, can provide operation of the individual worker score system associated with individual scorecard dashboard 1410. One or more databases associated with individual workers and related tasks, respective team(s) of individual worker(s), related warehouse(s), and the like can be provided at the job site (e.g., warehouse) or remotely (e.g., via the cloud) for memory needs such as functions of scorecard dashboard 1410. Sensor devices of one or more areas and/or assets of the warehouse may be connected therewith along with worker computing device actively sensing information from respective workers. Changes in scorecard dashboard 1410 may reveal deltas or changes so that the individual worker, the overall system or any other system user aside from the respective individual worker (e.g., an associated shift manager) can take action preemptively and/or in real-time in response to such changes and/or performance anomalies.

In some aspects, a scorecard dashboard 1412 to view individual workers scores can be included with scorecard dashboard 1410. Scorecard dashboard 1412 can receive and aggregate data from the sensor devices of the respective job site (e.g., warehouse) as well as area(s) within the job site. Scorecard dashboard 1412 can also receive and aggregate data from worker the computing devices of or otherwise connected to workers (e.g., worker computing devices such as mobile devices or other personal computing devices, wearable biometric devices, smart badges, etc.). Scorecard dashboard 1412 can track for individual workers task progress against task expectations, task performance, overall performance and the like. Other performance indicators tracked and used to determine individual performance metrics and related dynamic individual performance insights include but are not limited to overall performance against a predetermined plan (e.g., time worked versus number of units moved), "on standard" which is understood as time worked versus site goal per task (e.g., a KPI task target deviation, a task performance standard, etc.), percent effectiveness (e.g., time worked versus planned breaks), attendance, engagement (e.g., determined objectively from worker computing devices), clicks per hour by the individual worker, time spent with eyes on a display screen, etc. In some aspects, scorecard dashboard 1412 can also include aspects which are dimensioned by task or rate of a predetermined performance parameter (e.g., frequency of updating worker preferences, frequency that worker checks their performance score, frequency of worker's career trajectory, frequency of worker performing one or more of the same tasks.

Scorecard dashboard 1412 can also include aspects such as individual performance quality score, which can be determined based on objective performance quality parameters detected from worker computing devices and/or sensor devices. For example, each completed or ongoing tasks can receive a quality score, which can be tracked and presented by scorecard dashboard 1412.

In some aspects, scorecard dashboard 1412 can provide or otherwise present individual worker profiles to facilitate viewing worker task assignments in alignment with individual worker profiles, preferences, career incentives, career promotions, etc. Profile attributes, which can be tracked and used to populate worker profiles and related profile insights, include but are not limited to worker profile picture, name, salary, role, functional area, work schedule, days at a job, preferences, work groups, certifications, hours active, location preference, career trajectory, seniority, etc.

Scorecard dashboard 1412 can also include aspects such as individual worker satisfaction score, which can be determined based on objective satisfaction parameters detected from worker computing devices and/or sensor devices herein discussed metrics and/or insights determined in connection with scorecard dashboard 1412 as to engagement and performance. Individual worker satisfaction scores are particularly advantageous for determining and preemptively providing corrective actions for potential schedule delays based on the individual worker satisfaction score(s).

Figure 15:
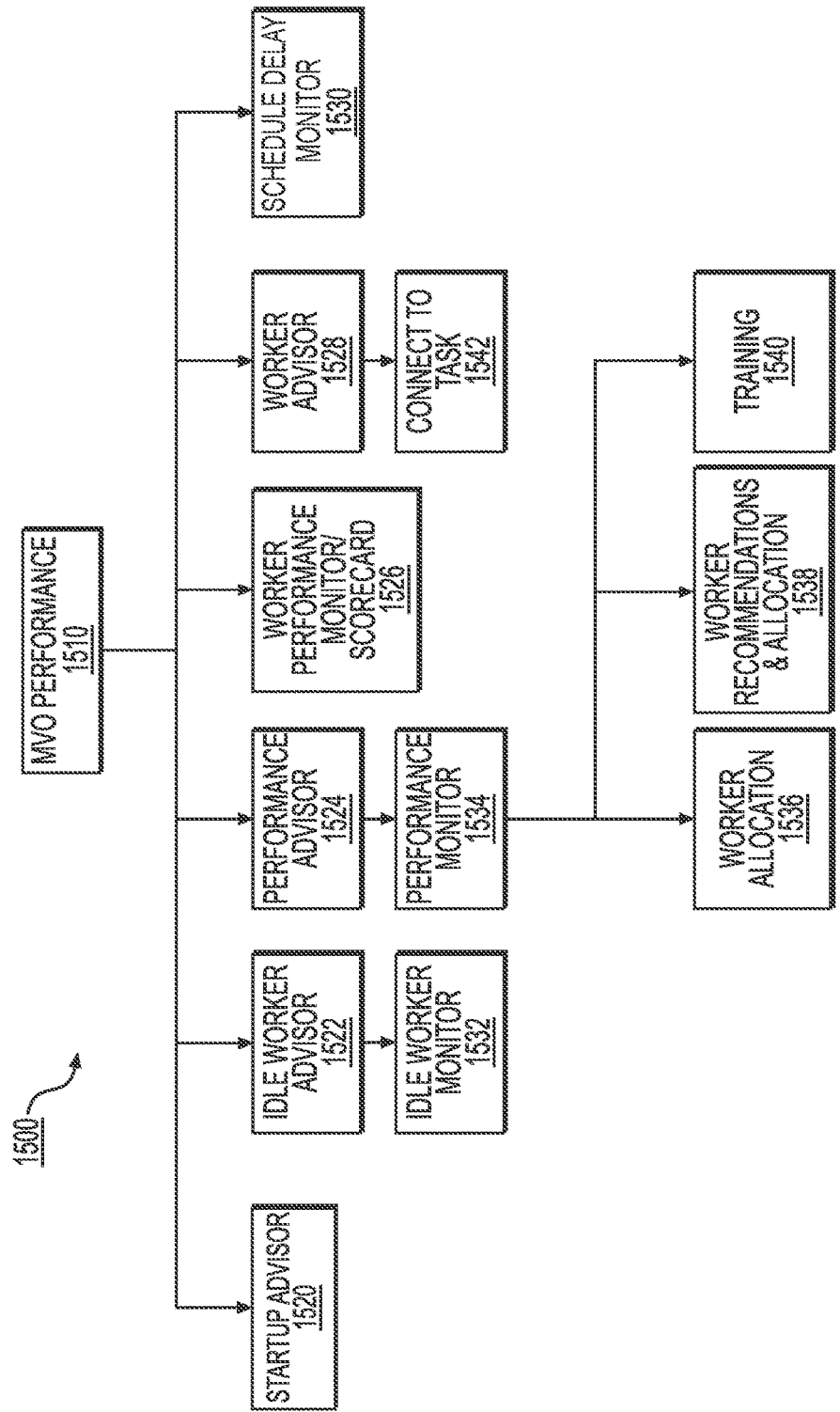
FIG. 15 is a diagram of architecture of a management view option (MVO) performance scorecard dashboard of a connected warehouse system of this disclosure.

FIG. 15 depicts architecture 1500 of a management view option (MVO) performance scorecard dashboard 1510 of a connected warehouse system of this disclosure. In some aspects, scorecard dashboard 1510 can include objective information related to MVO performance parameters. For example, scorecard dashboard 1510 can present an MVO performance score on a numeric scale or present a color rating summarizing workforce performance in real-time.

The MVO performance dashboard 1510 can include any herein described scores and/or dashboards and be viewable by a management user (e.g., a shift manager). However, other users are contemplated to view or otherwise access or use the MVO performance dashboard 1510. For example, a startup advisor dashboard 1520 can be included similar to previously discussed workforce startup module 1312. Dashboard 1520 can be used to analyze aggregated information from system connected worker computing devices and/or warehouse sensor devices and present feedback so that the system and/or system user(s) can in real-time monitor task(s) to determine whether tasks at startup are below, at, or exceeding task expectations and corrective action(s) and related insights can be promptly taken. Corrective actions can include encouraging the respective worker, providing a corrective task, inviting another user(s) to help the respective user, and the like.

An idle worker advisor dashboard 1522 can also be included similar to previously discussed idle worker scorecard 1314. Dashboard 1522 can track one or more workers or one or more teams of workers to view all on-shift workers who have not scanned or otherwise provided a task update (e.g., worked tasks, scanned task, completed task, etc.) in a predetermined amount of time (E.g., the previous 5 minutes, the previous 10 minutes, the last hour, a duration of the current shift). Dashboard 1522 can include an idle worker monitor engine 1532 configured to actively monitor for workers who are performing below performance standards (e.g., worker(s) who have not scanned or completed task(s) in some predetermined time range). Engine 1532 can be configured to track and present insights such as impact of idle time per worker(s).

A performance advisor dashboard 1524 can also be included, similar to previously discussed scorecard 1316. Similar to scorecard 1316, dashboard 1524 can identify outlier performers (top performers, poor performers) so that responsive action can be taken (e.g., rewarding action, encouragement action, etc.) whereby outlier performers can be determined by comparing performance parameters against others (e.g., peers in a respective team, members of other teams, etc.). Performance parameters can include task type, worker level (e.g., seniority related to others, worker certifications, etc. Dashboard 1524 can include a worker performance monitor engine 1534 configured to actively monitor for workers who are performing in excess of or below performance standards. Engine 1534, in turn, can include worker allocation module 1536, worker recommendation module 1538, and worker training module 1540.

Module 1536 can be configured similar to scorecard 1320, whereby module 1536 can monitor and provide insights for worker allocation. In certain aspects, module 1536 can be used so that dashboard 1510 can provide worker allocation visibility (e.g., which workers have arrived for shifts, how each department of a worksite is performing related to worker allocation and status of arrived workers, etc.) and present worker allocation insights relative to expected worker allocation, expected worker performance, and/or status of related tasks. Upon monitoring and determining that allocation anomalies are present or trending to be present, corrective actions can be recommended and/or taken by corresponding worker allocation recommendation module 1538, including practical allocation adjustments to adapt to allocation variations as they occur. Other modules are contemplated, including but not limited to a training module 1540 configured to actively present recommended training protocols for worker allocation and/or improving worker performance.

In some aspects, scorecard 1316 can include and continually dynamically update lists of top performers and poor performers (e.g., top 5 and bottom 5 workers) based on performance parameters such as overall shift performance, on-standard performance, effectiveness at a respective task or sub-task, as well as engagement.

A worker performance monitor and/or scorecard dashboard 1526 can also be included, similar to previously discussed scorecard dashboard 1412. Dashboard 1526 can present information such as tracked individual workers task progress against task expectations, task performance, overall performance and the like. Other performance indicators used in dashboard 1526 tracked and used to determine individual performance metrics and related insights include but are not limited to overall performance against a predetermined plan (e.g., time worked versus number of units moved), "on standard", percent effectiveness, attendance, engagement (e.g., determined objectively from worker computing devices), clicks per hour by the individual worker, time spent with eyes on a display screen, etc. In some aspects, similar scorecard dashboard 1412, scorecard dashboard 1526 includes aspects which are dimensioned by task or rate of a predetermined performance parameter (e.g., frequency of updating worker preferences, frequency that worker checks their performance score, frequency of worker's career trajectory, frequency of worker performing one or more of the same tasks, etc.).

Scorecard dashboard 1526 can also include individual performance quality score as well as individual worker profiles so as to facilitate viewing worker task assignments in alignment with individual worker profiles, preferences, career incentives, career promotions, etc. Profile attributes, which can be tracked and used to populate worker profiles and related profile insights, include but are not limited to worker profile picture, name, salary, role, functional area, work schedule, days at a job, preferences, work groups, certifications, hours active, location preference, career trajectory, seniority, etc.

Scorecard dashboard 1526 can also include or be in communication with worker engagement advisor dashboard 1528. Dashboard 1528 can include aspects, such as logic and analytics, to determine individual worker satisfaction based on objective satisfaction parameters detected from worker computing devices and/or sensor devices to track worker engagement and performance. Based on insights determined by or in connection with dashboard 1528, a connect-to-task engine 1542 can prompt specific real-time recommendations for workers to get back on or otherwise improve task performance of one or more specific tasks.

Scorecard dashboard 1526 can also include or be in communication with schedule delay monitor 1530. Monitor 1530 in turn can include aspects, such as logic and analytics, to determine or otherwise present information related to workers, including high-value workers and low-value workers, who according to schedule delays scores and/or related schedule delay insights are potential schedule delays. In some aspects, schedule delay scores and/or related schedule delay insights can be calculated based on aggregated data measuring worker engagement and performance.

Figure 16A:
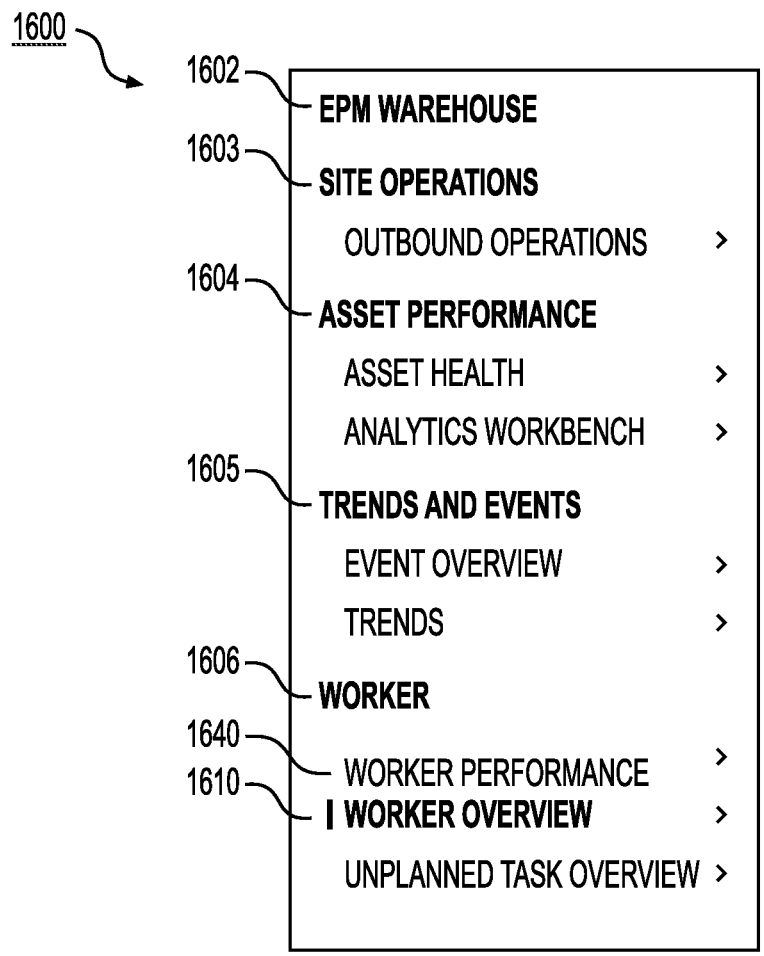
FIG. 16A depicts an example user interface for a job site (e.g., a connected warehouse) including a plurality of dashboards according to an exemplary embodiment.

FIG. 16A depicts an example user enterprise warehouse management interface 1600 including a plurality of selectable dashboards. The dashboards of interface 1600 can include a warehouse performance management dashboard 1602, a site operations dashboard 1603, an asset performance dashboard 1604, a trends and events dashboard 1605, a worker dashboard 1606 which can include a worker performance dashboard 1640, and a worker overview performance dashboard 1610. In some aspects, one or more of the plurality of dashboards of interface 1600 can be positioned in a single frame or multiple frames. In certain aspects, each of the dashboards of interface 1600 can be positioned as tiles capable of being toggled to enlarge or otherwise accessed by user. Interface 1600 can also present sub-dashboards key performance indicator (KPI) summaries (e.g., with names and/or one or more KPI summaries and related metrics).

FIG. 16B depicts example user interface dashboard 1610 associated with interface 1600. As shown, dashboard 1610 can present information of an overall worker overview including a plurality of worker information and related KPIs. For example and without limitation, dashboard 1610 can include a list of one or more workers 1612 currently at the job site, present associated status 1616 (e.g., active, inactive, on break, idle, etc.) for each of the one or more workers 1612, the area 1620 of a respective worker at the job site (e.g., shipping area, picking area, packing area, etc.), a color coded user time indicator 1624, idle time 1628 for each worker relative to current shift, performance percentage 1632 per worker, and effectiveness percentage 1636 per worker. Dashboard 1610 can also include one or more filter options to facilitate viewing of aspects thereof.

Figure 16C:
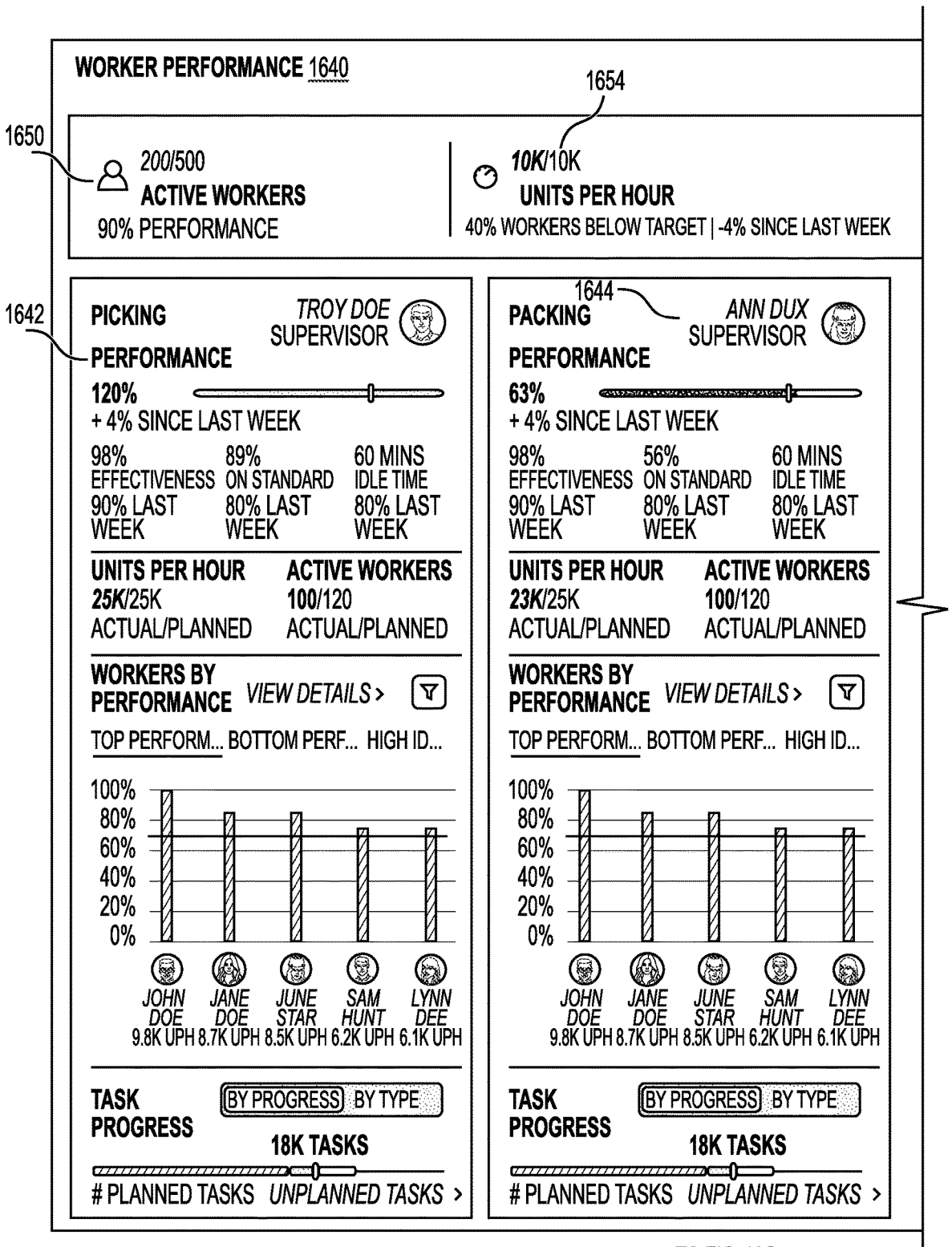
FIG. 16C depicts an example close-up user interface dashboard of FIG. 16A in a worker performance mode, according to an exemplary embodiment.

FIG. 16C depicts example user interface dashboard 1640 associated with interface 1600. As shown, dashboard 1640 can present information related to worker performance including overall active worker KPIs such as active worker metrics 1650 (e.g., percent performance, number of active workers versus available workers), production rate 1654 (e.g., units per hour for the job site, KPIs related to production rates of workers, production trends, etc), and/or the like. One or more individual worker performance dashboards 1642, 1644, 1646 can also be provided. Each dashboard 1642, 1644, 1646 can indicate information related to a respective worker, including worker name, worker picture, and worker KPIs such as rates of effectiveness, on standard, idle time, production, site location, and task progress. One or more graphical performance interfaces can also be included in dashboards 1642, 1644, 1646, such as line graphs comparing KPIs of workers (e.g., top performers, bottom performers, etc.). Dashboard 1640 can also include one or more filter options to facilitate viewing of aspects thereof.

Aspects of FIGS. 1-16C are advantageous for measuring Worker assignment/task progress in contextually relevant dimensions, visualize in real-time, and alert users (e.g., supervisor(s) and/or stakeholder(s)) upon identified anomalous trend deviations from rates of worker KPIs.

Figure 17:
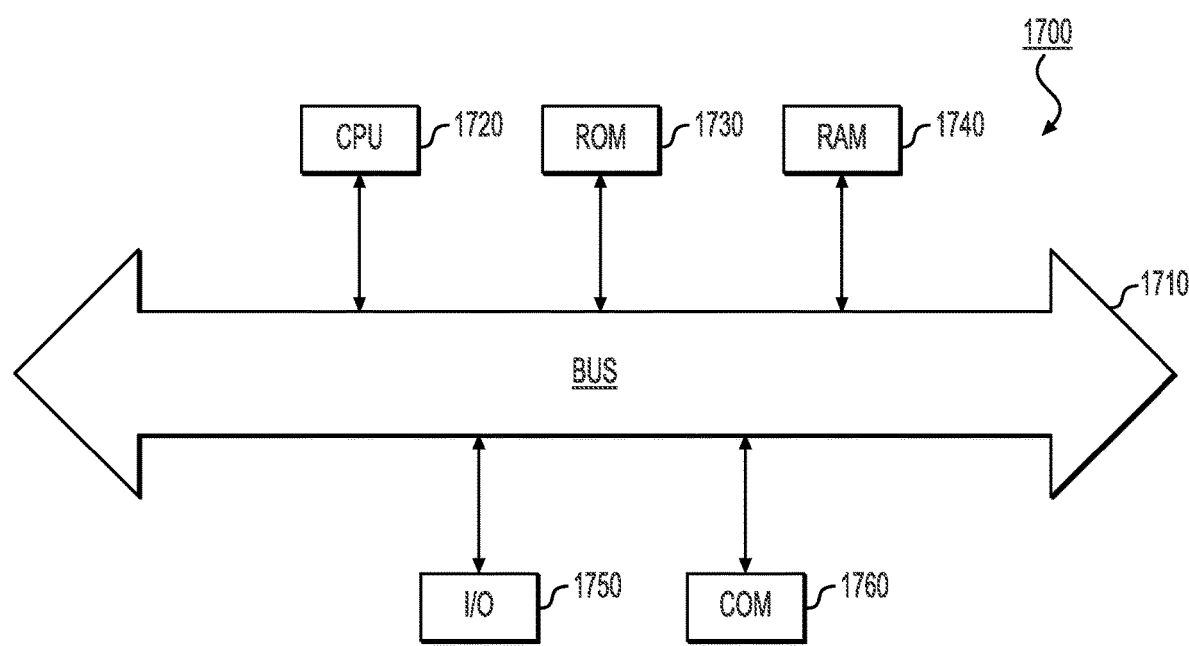
FIG. 17 illustrates an exemplary device in which one or more embodiments may be implemented.

Various embodiments of the present disclosure (e.g., edge systems, gateway systems, operations centers, remote systems, warehouse systems, connected worker systems, etc.), as described above with reference to FIGS. 1-16C may be implemented using device 1700 in FIG. 17. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 17, device 1700 may include a central processing unit (CPU) 1720. CPU 1720 may be any type of processor device including, for example, any type of special purpose or a general purpose microprocessor device. As will be appreciated by persons skilled in the relevant art, CPU 1720 also may be a single processor in a multi-core/multi-processor system, such system operating alone, or in a cluster of computing devices operating in a cluster or server farm. CPU 1720 may be connected to a data communication infrastructure 1710, for example, a bus, message queue, network, or multi-core message-passing scheme.

Device 1700 may also include a main memory 1740, for example, random access memory (RAM), and may also include a secondary memory 1730. Secondary memory 1730, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1730 may include other similar means for allowing computer programs or other instructions to be loaded into device 1700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1700.

Device 1700 may also include a communications interface ("COM") 1760. Communications interface 1760 allows software and data to be transferred between device 1700 and external devices. Communications interface 1760 may include a modem, a network interface (such as an Ethernet card), a communications port, a PCMCIA slot and card, or the like. Software and data transferred via communications interface 1760 may be in the form of signals, which may be electronic, electromagnetic, optical, or other signals capable of being received by communications interface 1760. These signals may be provided to communications interface 1760 via a communications path of device 1700, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 1700 also may include input and output ports 1750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems and methods of this disclosure can be cloud-based, multi-tenant solutions configured to deliver optimized work instructions tailored for specific vertical workflows utilizing an easy to deploy, scalable, and configurable data model and software suite to deliver performance insights and improve worker productivity.

The disclosure provides one or more user interface systems for smart worker performance scoring and evaluation of a job site (e.g., one or more warehouses), whereby information from sensors and/or connected worker computing devices may provide dynamic data about job performance (e.g., productivity of worker(s), task productivity, production productivity, etc.), a processor and database(s) for receiving and processing the dynamic data, and having a program that aggregates and analyzes the dynamic data for one or more categories of the one or more worker performance. The data analysis may determine performance scores for each of the one or more performance categories, and calculate an overall worker performance score. The worker performance score for each category of this disclosure may be displayed on a dashboard and/or related scorecards. In some aspects, one or more functions are used to calculate scores (e.g., assigning a coefficient factor to values of categories such as time on task, time between tasks, number of tasks completed, idle state, etc.). The coefficient factor may be determined from a comparison value based on some predetermined standard and/or worker performance historical data of the one or more categories. Any of the herein disclosed dashboards and related user interfaces may present worker performance scores and related details of the dynamic data for detecting and solving worker performance issues (e.g., recommended corrective actions) without changing the dashboard or the monitor.

The worker performance scores of this disclosure can include numerous scores and sub-scores, including performance scores, environmental scores related to the job site and/or areas of a job site (e.g., utility consumption, carbon footprint, emissions, etc.), health scores, safety scores, maintenance scores, job site asset scores, happiness scores, etc. Such scores are also advantageous for use in using trained machine learning models to predict performance impacts depending on trends of all such scores of this disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for controlling worker performance in a warehouse, comprising:
    a plurality of sensor devices located throughout the warehouse and connected over a network;
    a plurality of worker computing devices, each worker computing device corresponding to at least one of a plurality of workers of the warehouse;
    a memory connected to the network;
    a user interface connected to the network and including a display configured to display a real-time dashboard comprising a menu displaying a plurality of worker performance metrics in the warehouse; and
    a processor connected to the network configured to:
    determine, by an insight module, a dynamic allocation of workers of the warehouse according to locations within the warehouse, wherein the insight module is configured to aggregate and analyze data from the sensor devices and the worker computing devices;

determine, by the insight module based on data aggregated in real-time from the sensor devices and the worker computing devices, the plurality of worker performance metrics, the plurality of worker performance metrics comprising at least one of a dynamic worker performance score, a worker productivity score, an aggregated idle time per worker;

determine, using a schedule delay monitor, a schedule delay score associated with the plurality of workers;

store the schedule delay score associated with the plurality of workers in a storage service connected to the network;

generate on the dashboard of the display a dynamic real-time summary of the plurality of worker performance metrics, wherein the dynamic real-time summary comprises a management view option (MVO) performance scorecard dashboard comprising a first dynamically updated performance dashboard indicative of the schedule delay score;

generate on the dashboard of the display a plurality of selectable dashboard tiles, wherein the plurality of selectable dashboard tiles comprises a selectable worker performance dashboard tile corresponding to one or more of the plurality of worker performance metrics;

receive, via the display, a toggle operation corresponding to the selectable worker performance dashboard tile;

expand, based on the toggle operation, the selectable worker performance dashboard tile to render on the dashboard of the display a worker performance dashboard comprising a first subsidiary worker performance metric interface component and a second subsidiary worker performance metric interface component, wherein the first subsidiary worker performance metric interface component is configured to display a first worker performance metric of the plurality of worker performance metrics and the second subsidiary worker performance metric interface component is configured to display a second worker performance metric of the plurality of worker performance metrics; and assign, based on at least one of the first worker performance metric displayed on the first subsidiary worker performance metric interface component or the second worker performance metric displayed on the second subsidiary worker performance metric interface component, at least one task or at least one equipment.

2. The system of claim 1, wherein the insight module determines the plurality of worker performance metrics by aggregating and analyzing data from a plurality of connected warehouse service systems, a plurality of connected performance management systems, a connected labor management system (LMS), and a gateway device, and wherein the plurality of worker performance metrics comprise one or more worker performance scores.

3. The system of claim 2, wherein the processor is configured to:

upon determining whether the plurality of worker performance metrics are below a performance standard and/or satisfy a key performance indicator (KPI) target deviation, generate on the dashboard of the display a dynamic corrective action to resolve one or more fault or anomalous worker performance symptom attributes.

4. The system of claim 2, wherein the processor is configured to:

connect the plurality of sensor devices to one or more Internet-of-Things (IoT) devices connected to the gateway device, the plurality of sensor devices including one or a combination of leak detection sensors, vibration sensors, and process sensors of the connected warehouse.

5. The system of claim 1, wherein the dynamic real-time summary further comprises at least one of an overall workforce scorecard dashboard and an individual worker scorecard dashboard.

6. The system of claim 5, wherein the overall workforce scorecard dashboard comprises a plurality of dynamically updated performance notifications comprising at least one of a workforce startup module, an idle worker scorecard, a top/poor performer scorecard, a recent hire scorecard, and a worker allocation scorecard.

7. The system of claim 5, wherein the individual worker scorecard dashboard comprises a dynamically updated notifications, and wherein the processor is configured to, upon determining whether worker performance metrics of an assigned task of a first worker of the plurality of workers satisfy a key performance indicator (KPI) task target deviation and/or a task performance standard, generate dynamic individual performance insights on the individual worker scorecard dashboard of the display.

8. The system of claim 5, wherein the MVO performance scorecard dashboard comprises a plurality of dynamically updated performance dashboards viewable by a management user and comprising at least one of a startup advisor dashboard, an idle worker advisor dashboard, and a worker performance monitor and/or scorecard dashboard.

9. The system of claim 1, wherein the plurality of worker performance metrics comprise a smart warehouse score summarizing overall warehouse workforce performance scores in real-time.

10. The system of claim 1, wherein the storage service comprises a real-time analytics database in which the schedule delay score is stored.

11. The system of claim 1, wherein the processor is configured to:

determine, using the schedule delay monitor, an updated schedule delay score associated with the plurality of workers; and update, in real-time, the first dynamically updated performance dashboard to be indicative of the updated schedule delay score.

12. A computer implemented method of operating a connected warehouse by performing, by at least one processor, operations comprising:

determine, by an insight module, a dynamic allocation of workers of the warehouse according to locations within the warehouse, wherein the insight module is configured to aggregate and analyze data from a plurality of sensor devices located throughout the warehouse and connected over a network and a plurality of worker computing devices, each worker computing device corresponding to at least one of a plurality of workers of the warehouse;

determine, by the insight module based on data aggregated in real-time from the sensor devices and the worker computing devices, a plurality of worker performance metrics comprising at least one of a dynamic worker performance score, a worker productivity score, an aggregated idle time per worker;

determining, using a schedule delay monitor, a schedule delay score associated with the plurality of workers;

storing the schedule delay score associated with the plurality of workers in a storage service connected to the network;

generate on a real-time dashboard of a display a dynamic real-time summary of the plurality of worker performance metrics, the display being on a user interface connected to the network, wherein the dynamic real-time summary comprises a management view option (MVO) performance scorecard dashboard comprising a first dynamically updated performance dashboard indicative of the schedule delay score;

generate on the dashboard of the display a plurality of selectable dashboard tiles, wherein the plurality of selectable dashboard tiles comprises a selectable worker performance dashboard tile corresponding to one or more of the plurality of worker performance metrics;

receive, via the display, a toggle operation corresponding to the selectable worker performance dashboard tile;

expand, based on the toggle operation, the selectable worker performance dashboard tile to render on the dashboard of the display a worker performance dashboard comprising a first subsidiary worker performance metric interface component and a second subsidiary worker performance metric interface component, wherein the first subsidiary worker performance metric interface component is configured to display a first worker performance metric of the plurality of worker performance metrics and the second subsidiary worker performance metric interface component is configured to display a second worker performance metric of the plurality of worker performance metrics; and assign, based on at least one of the first worker performance metric displayed on the first subsidiary worker performance metric interface component or the second worker performance metric displayed on the second subsidiary worker performance metric interface component, at least one task or at least one equipment.

13. The method of claim 12, wherein the insight module determines the plurality of worker performance metrics by aggregating and analyzing data from a plurality of connected warehouse service systems, a plurality of connected performance management systems, a connected labor management system (LMS), and a gateway device, and wherein the plurality of worker performance metrics comprise one or more worker performance scores.

14. The method of claim 13, further comprising:
upon determining whether the plurality of worker performance metrics are below a performance standard and/or satisfy a key performance indicator (KPI) target deviation, generating on the dashboard of the display a dynamic corrective action to resolve one or more fault or anomalous worker performance symptom attributes.

15. The method of claim 12, wherein the dynamic real-time summary further comprises at least one of an overall workforce scorecard dashboard and an individual worker scorecard dashboard.

16. The method of claim 15, wherein the overall workforce scorecard dashboard comprises a plurality of dynamically updated performance scorecards comprising at least one of a workforce startup module, an idle worker scorecard, a top/poor performer scorecard, a recent hire scorecard, and a worker allocation scorecard.

17. The method of claim 15, wherein the individual worker scorecard dashboard comprises a dynamically updated scorecard, wherein the method further comprises:
upon determining whether worker performance metrics of an assigned task of a first worker of the plurality of workers satisfy a key performance indicator (KPI) task target deviation and/or a task performance standard, generate dynamic individual performance insights on the individual worker scorecard dashboard of the display.

18. The method of claim 15, wherein the MVO performance scorecard dashboard comprises a plurality of dynamically updated performance dashboards viewable by a management user and comprising at least one of a startup advisor dashboard, an idle worker advisor dashboard, and a worker performance monitor and/or scorecard dashboard.

19. A system for exchanging real-time worker performance data in a connected warehouse, comprising:
one or more processors; and
a non-transitory computer readable medium storing instructions that, when executed by the one or more processors, cause the one or more processors to perform:
determine, by an insight module, a dynamic allocation of workers of the warehouse according to locations within the warehouse, wherein the insight module is configured to aggregate and analyze data from a plurality of sensor devices located throughout the warehouse and connected over a network and a plurality of worker computing devices, each worker computing device corresponding to at least one of a plurality of workers of the warehouse;
determine, by the insight module based on data aggregated in real-time from the sensor devices and the worker computing devices, a plurality of worker performance metrics comprising at least one of a dynamic worker performance score, a worker productivity score, an aggregated idle time per worker;
determine, using a schedule delay monitor, a schedule delay score associated with the plurality of workers;
store the schedule delay score associated with the plurality of workers in a storage service connected to the network;
generate on a real-time dashboard of a display a dynamic real-time summary of the plurality of worker performance metrics, the display being on a user interface connected to the network, wherein the dynamic real-time summary comprises a management view option (MVO) performance scorecard dashboard comprising a first dynamically updated performance dashboard indicative of the schedule delay score;
generate on the dashboard of the display a plurality of selectable dashboard tiles, wherein the plurality of selectable dashboard tiles comprises a selectable worker performance dashboard tile corresponding to one or more of the plurality of worker performance metrics;
receive, via the display, a toggle operation corresponding to the selectable worker performance dashboard tile;
expand, based on the toggle operation, the selectable worker performance dashboard tile to render on the dashboard of the display a worker performance dashboard comprising a first subsidiary worker performance metric interface component and a second subsidiary worker performance metric interface component, wherein the first subsidiary worker performance metric interface component is configured to display a first worker performance metric of the plurality of worker performance metrics and the second subsidiary worker performance metric interface component is configured to display a second worker performance metric of the plurality of worker performance metrics; and assign, based on at least one of the first worker performance metric displayed on the first subsidiary worker performance metric interface component or the second worker performance metric displayed on the second subsidiary worker performance metric interface component, at least one task or at least one equipment.

20. The system of claim 19, wherein the insight module determines the plurality of worker performance metrics by aggregating and analyzing data from a plurality of connected warehouse service systems, a plurality of connected performance management systems, a connected labor management system (LMS), and a gateway device, and wherein the plurality of worker performance metrics comprise one or more worker performance scores; and wherein the processor is configured to, upon determining whether the plurality of worker performance metrics are below a performance standard and/or satisfy a key performance indicator (KPI) target deviation, generating on the dashboard of the display a dynamic corrective action to resolve one or more fault or anomalous worker performance symptom attributes.

* * * * *